US012175731B2

(12) United States Patent
Kabzan et al.

(10) Patent No.: US 12,175,731 B2
(45) Date of Patent: Dec. 24, 2024

(54) PREDICTION ERROR SCENARIO MINING FOR MACHINE LEARNING MODELS

(71) Applicant: Motional AD LLC, Boston, MA (US)

(72) Inventors: Juraj Kabzan, Boston, MA (US); Sammy Omari, Pittsburgh, PA (US); Julia Gomes, San Francisco, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 18/356,452

(22) Filed: Jul. 21, 2023

(65) Prior Publication Data

US 2023/0360375 A1    Nov. 9, 2023

Related U.S. Application Data

(63) Continuation of application No. 18/078,594, filed on Dec. 9, 2022, now Pat. No. 11,741,692, which is a
(Continued)

(51) Int. Cl.
*G06T 7/20* (2017.01)
*G06V 10/774* (2022.01)
*G06V 20/58* (2022.01)

(52) U.S. Cl.
CPC .......... *G06V 10/7747* (2022.01); *G06T 7/20* (2013.01); *G06V 20/58* (2022.01);
(Continued)

(58) Field of Classification Search
CPC ....... G06V 10/7747; G06V 20/58; G06T 7/20
See application file for complete search history.

(56) References Cited

U.S. PATENT DOCUMENTS 9,632,502 B1    4/2017  Levinson et al.
9,933,781 B1    4/2018  Bando et al.
(Continued)

OTHER PUBLICATIONS

[No Author Listed], "Surface Vehicle Recommended Practice: Taxonomy and Definitions for Terms Related to Driving Automation Systems for on-Road Motor Vehicles," SAE International, Standard J3016, Sep. 30, 2016, 30 pages.
(Continued)

*Primary Examiner* — Sam Bhattacharya
(74) *Attorney, Agent, or Firm* — Fish & Richardson P.C.

(57) ABSTRACT

Provided are methods for prediction error scenario mining for machine learning methods, which can include determining a prediction error indicative of a difference between a planned decision of an autonomous vehicle and an ideal decision of the autonomous vehicle. The prediction error is associated with an error-prone scenario for which a machine learning model of an autonomous vehicle is to make planned movements. The method includes searching a scenario database for the error-prone scenario based on the prediction error. The scenario database includes a plurality of datasets representative of data received from an autonomous vehicle sensor system in which the plurality of datasets is marked with at least one attribute of the set of attributes. The method further includes obtaining the error-prone scenario from the scenario database for inputting into the machine learning model for training the machine learning model. Systems and computer program products are also provided.

30 Claims, 14 Drawing Sheets

Related U.S. Application Data continuation of application No. 17/673,633, filed on Feb. 16, 2022, now Pat. No. 11,562,556.

(52) U.S. Cl.
CPC ............ *G06T 2207/10028* (2013.01); *G06T 2207/20081* (2013.01); *G06T 2207/30261* (2013.01)

(56) References Cited

U.S. PATENT DOCUMENTS

| | | | |
|---|---|---|---|
| 11,550,851 B1 | 1/2023 | Kabzan et al. | |
| 11,562,556 B1 | 1/2023 | Kabzan et al. | |
| 11,741,692 B1 | 8/2023 | Kabzan et al. | |
| 2016/0247394 A1 | 8/2016 | Stenneth | |
| 2017/0190331 A1 | 7/2017 | Gupta et al. | |
| 2017/0192423 A1 | 7/2017 | Gupta et al. | |
| 2017/0213149 A1 | 7/2017 | Micks et al. | |
| 2017/0329332 A1 | 11/2017 | Pilarski et al. | |
| 2017/0356750 A1 | 12/2017 | Iagnemma | |
| 2018/0086344 A1 | 3/2018 | Zhu et al. | |
| 2018/0107770 A1 | 4/2018 | Cahoon et al. | |
| 2019/0170511 A1 | 6/2019 | Maucher et al. | |
| 2019/0197778 A1 | 6/2019 | Sachdeva et al. | |
| 2019/0378040 A1 | 12/2019 | Ali et al. | |
| 2020/0233426 A1 | 7/2020 | Johnson et al. | |
| 2021/0041239 A1* | 2/2021 | Chen | G01S 19/47 |
| 2021/0356968 A1 | 11/2021 | Zaremba et al. | |
| 2023/0252084 A1 | 8/2023 | Kabzan et al. | |
| 2023/0260261 A1 | 8/2023 | Kabzan et al. | |

OTHER PUBLICATIONS

International Search Report and Written Opinion in International Appln. No. PCT/US2023/012293, dated Apr. 18, 2023, 14 pages.

International Search Report and Written Opinion in International Appln. No. PCT/US2023/012629, mailed on Jun. 14, 2023, 15 pages.

motional.com [online], "Technically Speaking: Auto-labeling With Offline Perception," Nov. 24, 2021, retrieved on May 22, 2024, retrieved from URL<https://motional.com/news/technically-speaking-auto-labeling-offline-perception>, 6 pages.

motional.com [online], "Technically Speaking: Learning With Every Mile Driven," Oct. 27, 2021, retrieved on May 22, 2024, retrieved from URL<https://motional.com/news/technically-speaking-learning-every-mile-driven>, 7 pages.

motional.com [online], "Technically Speaking: Mining for scenarios to help better train our AVs," Jan. 13, 2022, retrieved Nov. 1, 2023, retrieved from URL <https://motional.com/news/technically-speaking-mining-scenarios-help-better-train-our-avs>, 7 pages.

\* cited by examiner

PREDICTION ERROR SCENARIO MINING FOR MACHINE LEARNING MODELS

This Application is a Continuation of application Ser. No. 18/078,594 filed on Dec. 9, 2022. application Ser. No. 18/078,594 is a Continuation of application Ser. No. 17/673,633 filed on Feb. 16, 2022. The entire contents of these applications are incorporated herein by reference in their entirety.

BACKGROUND

An autonomous vehicle is a vehicle that is capable of sensing its environment and navigating without human input. Autonomous vehicles rely on multiple types of sensors to perceive the surrounding environment. The sensors provide the autonomous vehicle with data representative of the surrounding environment. The autonomous vehicle performs various processing techniques on the data to make safe and correct movement decisions. These decisions safely navigate the autonomous vehicle to choose a path to avoid obstacles and react to a variety of different driving scenarios, such as the abrupt movements of proximate vehicles.

Testing all conditions and scenarios that an autonomous vehicle must navigate is generally dangerous and unfeasible in real-world driving environments. Moreover, conventional simulators typically do not test a variety of different driving scenarios and fail to identify or test movement decisions of the autonomous vehicle in error-prone scenarios.

DETAILED DESCRIPTION

Figure 1:
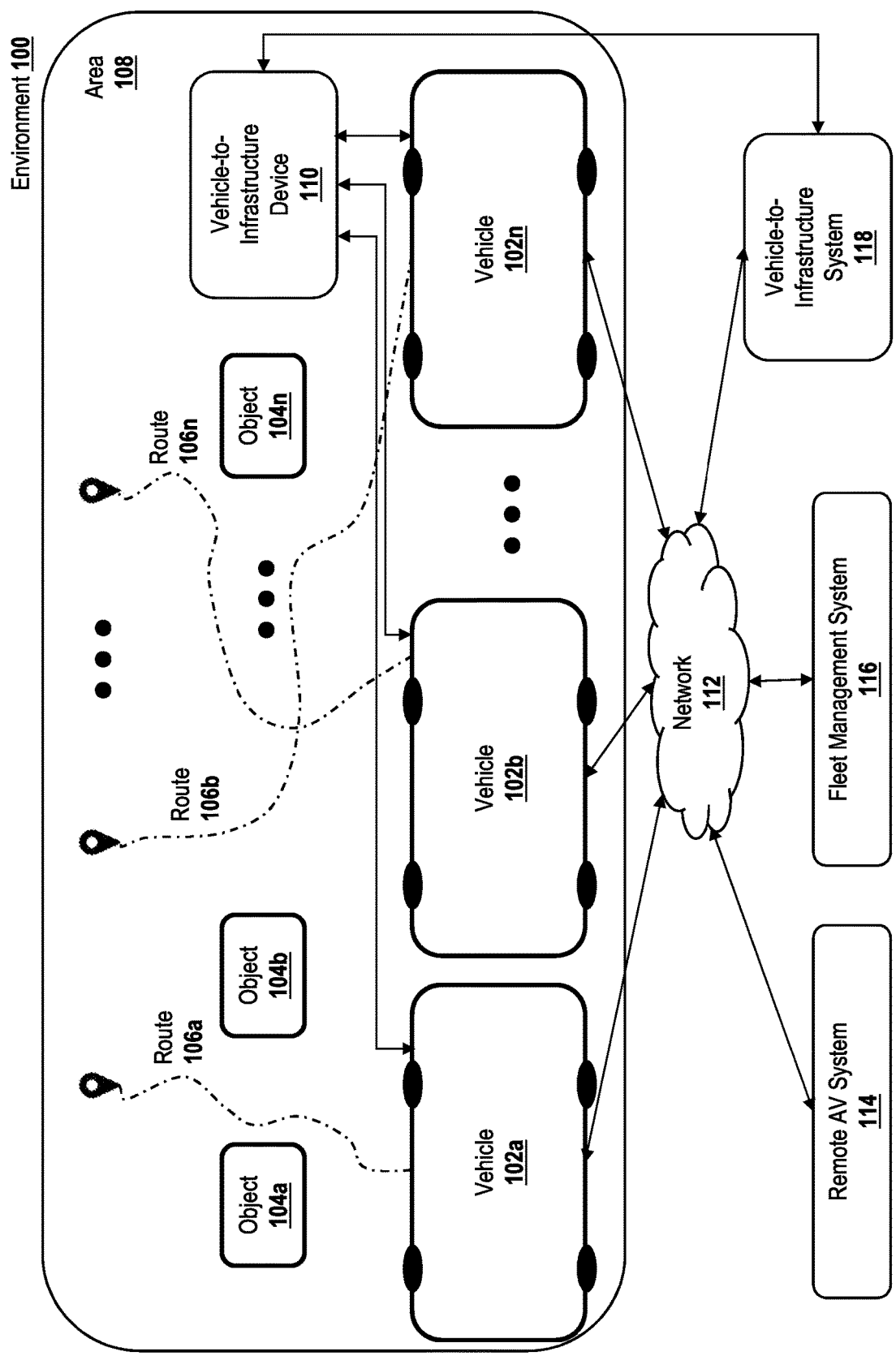
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising,"

when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement prediction error scenario mining for machine learning models. A scenario mining system can identify uncommon scenarios potentially encountered by a vehicle (such as an autonomous vehicle). Scenario mining is a technique in which driving scenarios are identified from a database of driving scenarios to further train a machine learning model of a vehicle. For example, the driving scenarios that are error-prone for the machine learning model may be mined to further train the machine learning model to safely respond to these problematic driving scenarios. Scenario mining is carried out by searching a scenario database based on a prediction error to identify the driving scenario of interest. Further, scenario mining is performed for the machine learning model in order to assess how the vehicle's systems would respond to rare and edge-case scenarios. As an example technique, a scenario mining system determines a prediction error associated with an error-prone scenario for which a machine learning model of a vehicle is to make planned movements. The error-prone scenario includes a prediction error indicative of a difference between a planned decision of the vehicle and an ideal decision of the vehicle. For example, an error-prone scenario for the machine learning model has a prediction error in predicting a planned safe trajectory instead of a head-on collision in response to a predicted movement of an agent vehicle while the autonomous vehicle making an unprotected turn.

The prediction error is associated with an error-prone scenario for which the machine learning model of the autonomous vehicle is to make planned decisions. The error-prone scenario is identified based on the prediction error in the scenario database. The scenario database includes a plurality of datasets representative of data received from a vehicle sensor's system. The error-prone scenario from the scenario database is then obtained for inputting into the machine learning model for training the machine learning model. The error-prone scenario includes a dataset with the prediction error found in the scenario database. This technique identifies error-prone scenarios to determine how the vehicle's systems would handle such scenarios in the real world.

By virtue of the implementation of systems, methods, and computer program products described herein, techniques for prediction error scenario mining for machine learning models. Unlike other methods for training machine learning models, the scenario mining framework described herein includes techniques for mining scenarios in a scenario database based on prediction errors. The scenario database includes a plurality of datasets to be mined, the plurality of datasets including error metadata indicative of a prediction error of the machine learning model. Without the ability to mine the scenario database, brute force training and experimentation would be the costly and inefficient alternative for the creation of safe and comprehensive autonomous vehicle machine learning models. Brute force testing requires every possible scenario to be inputted to the machine learning model. Not only is this inefficient and costly, but brute force testing fails to adapt and predict new error-prone scenarios that drivers and autonomous vehicles encounter alike. Further, brute force search testing is insufficient as the number of potential edge-case and error-prone scenarios constantly increase and change over time. As a technical improvement, the scenario database described herein mines for complex scenarios using SQL queries using prediction errors of these complex scenarios.

Further, the prediction error searching system solves technical problems associated with training a machine learning model configured to make planned movements for an autonomous vehicle. Technical problems include obtaining evaluation metrics for error-prone scenarios to ensure autonomous vehicles are safe for rare and edge-case scenarios. For example, a machine learning model trained in a variety of city scenarios may behave poorly or even dangerously when the model predicts a safe trajectory instead of a head-on collision in response to predicting a movement of a land mammal on a country road. Without identifying error-prone scenarios and their associated metrics, it may be unclear the extent of the effect that any one of these uncommon scenarios would have on the autonomous vehicle's ability to continue navigation.

Other technical problems include a lack of a data model showing that the machine learning model is properly trained for uncommon and error-prone scenarios beyond the natural distribution of driving scenarios. For example, manual scenario mining may be overly concerned by the effects of large trucks making unprotected turns on the planned movements of the machine learning model. But the underdeveloped area of the machine learning model may be the planned movements of the autonomous vehicles in response to the predicted movements of bicyclists at four-way stops. Where a human operator would overlook this edge case scenario, the scenario mining framework based on prediction errors described herein takes a data-driven approach to ensure that the machine learning model is trained for the most uncommon and error-prone scenarios. Without this data-driven approach, it is unclear whether the machine learning model can make safe planned movements for the autonomous vehicle. As such, there is a need for a system to search and obtain an error-prone scenario having a prediction error at a scenario database.

The architecture of the prediction error scenario mining framework and combination of steps to implement the scenario mining improves on existing frameworks and methods. For example, other frameworks require running a new scenario miner on all of the logged datasets for each new scenario of interest. Such simulations are costly, fail to consider scenarios in which prediction errors are relevant, and cannot dynamically adjust searches for optimal results. In contrast, the architecture of the prediction error scenario mining framework provides the most comprehensive results by creating a scenario database in which all existing prediction errors across all relevant datasets may be dynamically searched for in a single process.

Further, the architecture of the prediction error scenario mining framework marks and accesses multiple sources of logged datasets to identify the most error-prone scenarios that the autonomous vehicle can navigate. This marking and accessing allow new prediction errors and scenarios to be dynamically integrated by adding error metadata to the data received from the autonomous vehicle sensor system. Additionally, the machine learning model continually improves on its own by iterating on data in addition to algorithms. For example, error-prone scenarios are flagged up and stored in the scenario database for later evaluation, which provides data-driven insight into the focus of algorithmic development for the machine learning model. The usefulness of the scenario mining described herein results in a higher likelihood that the autonomous vehicle stack will perform well when planning movements in real scenarios.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
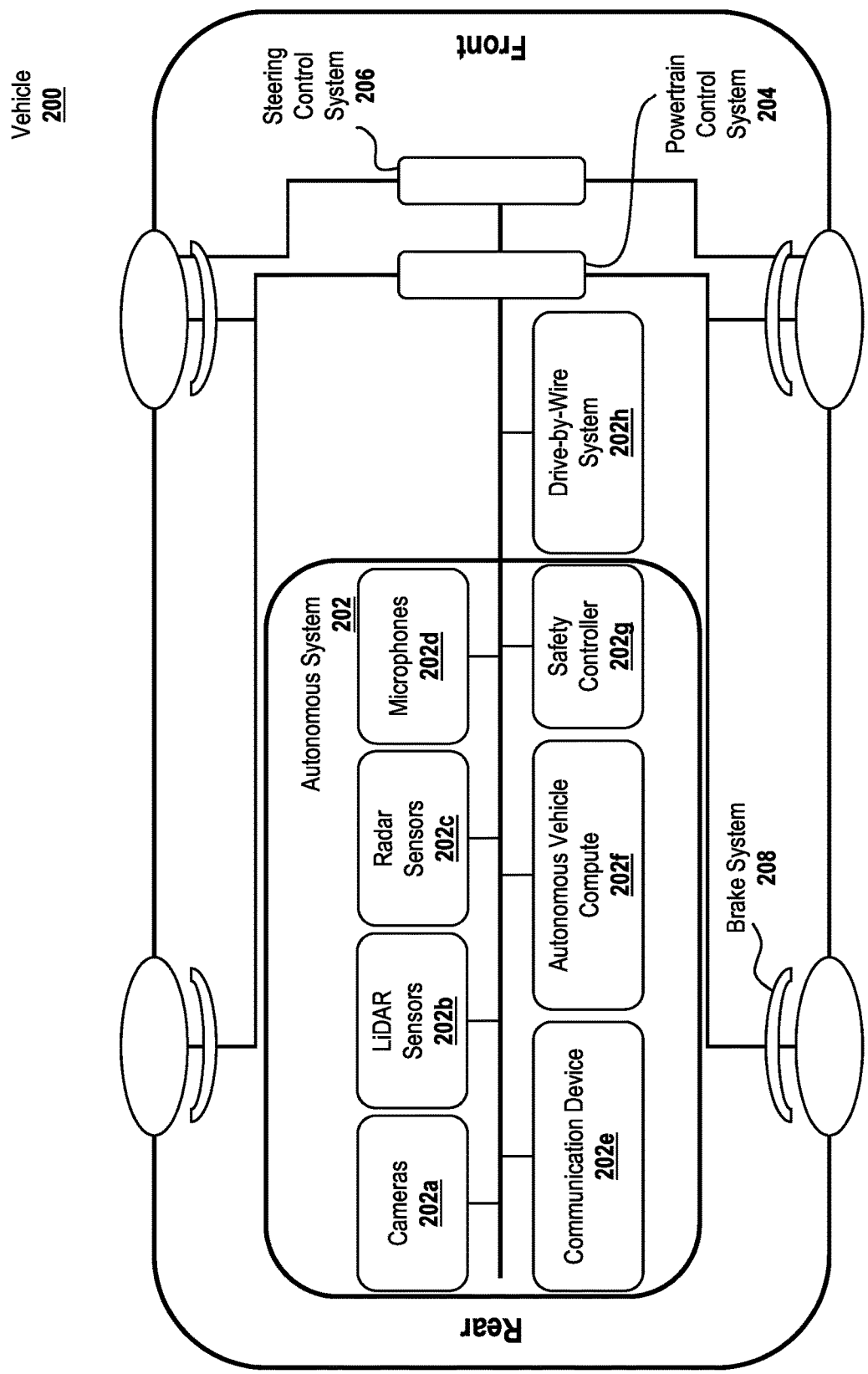
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
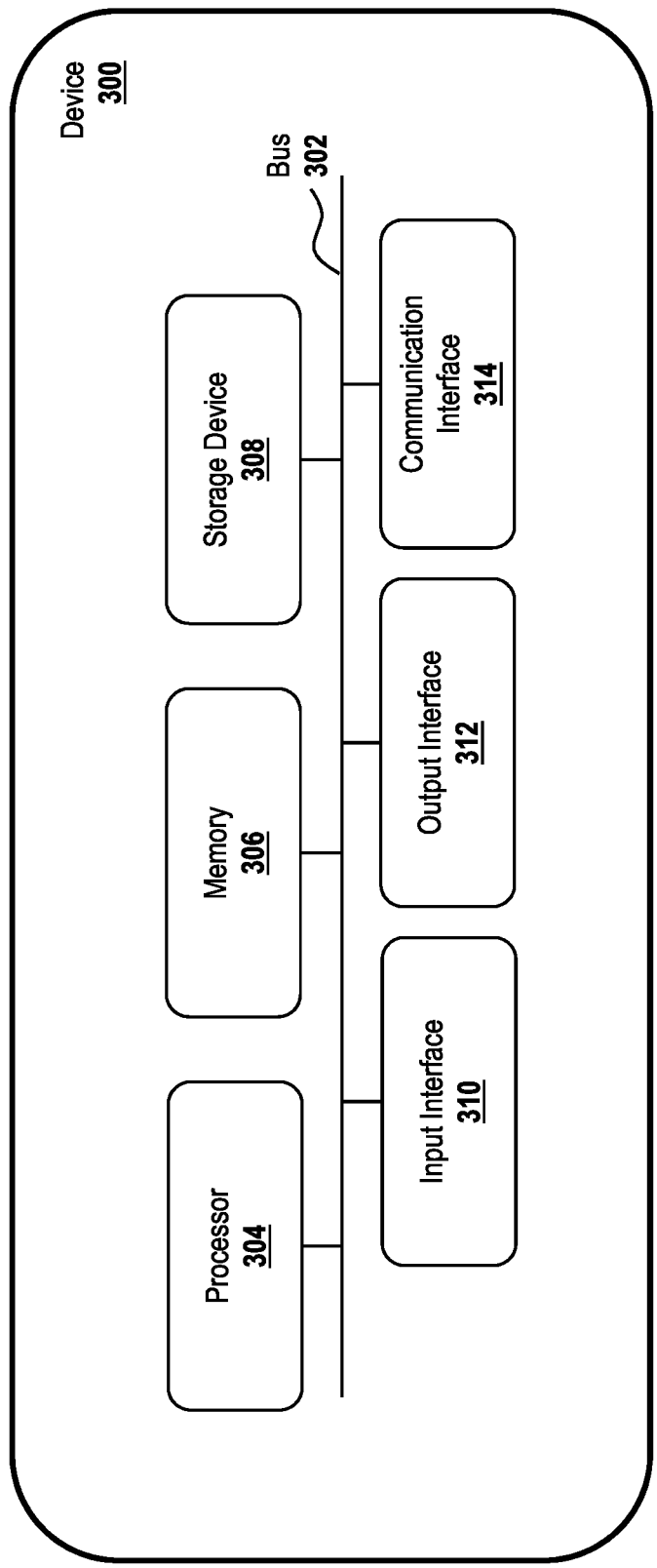
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
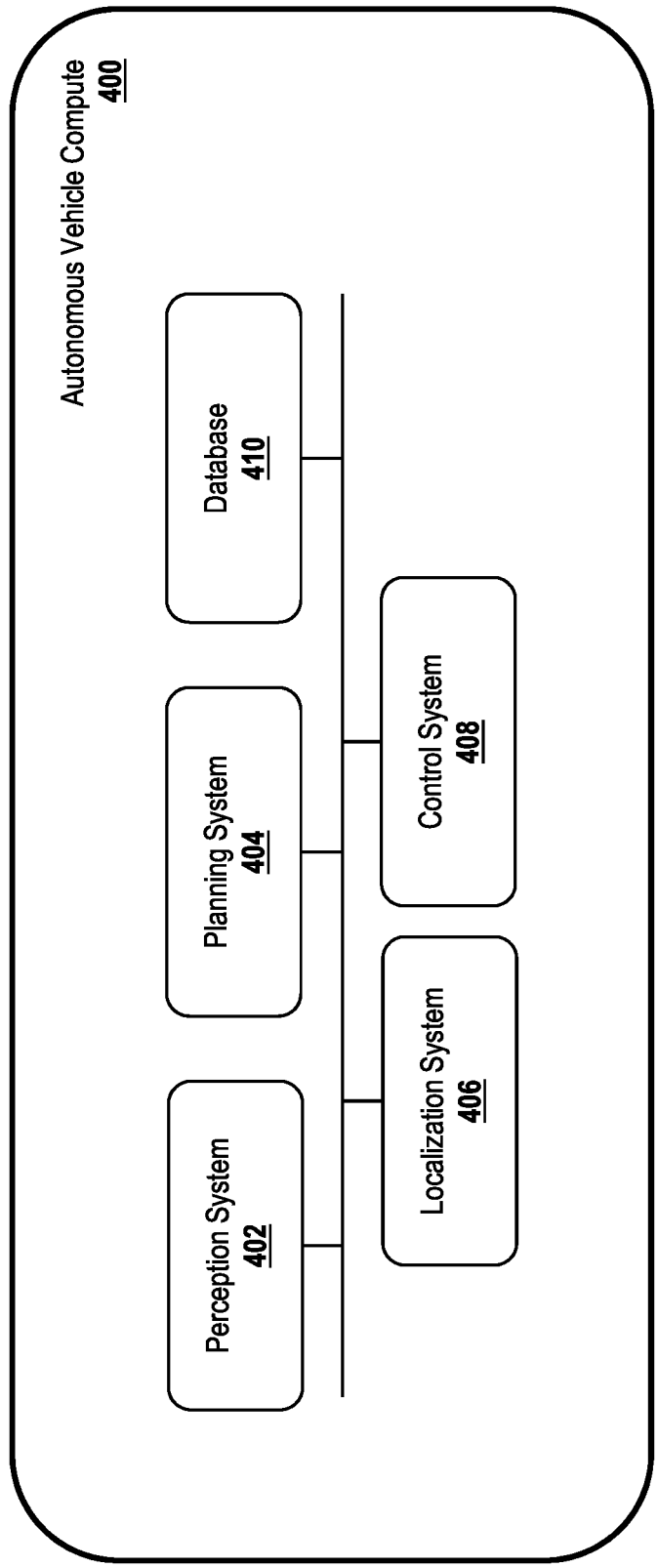
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
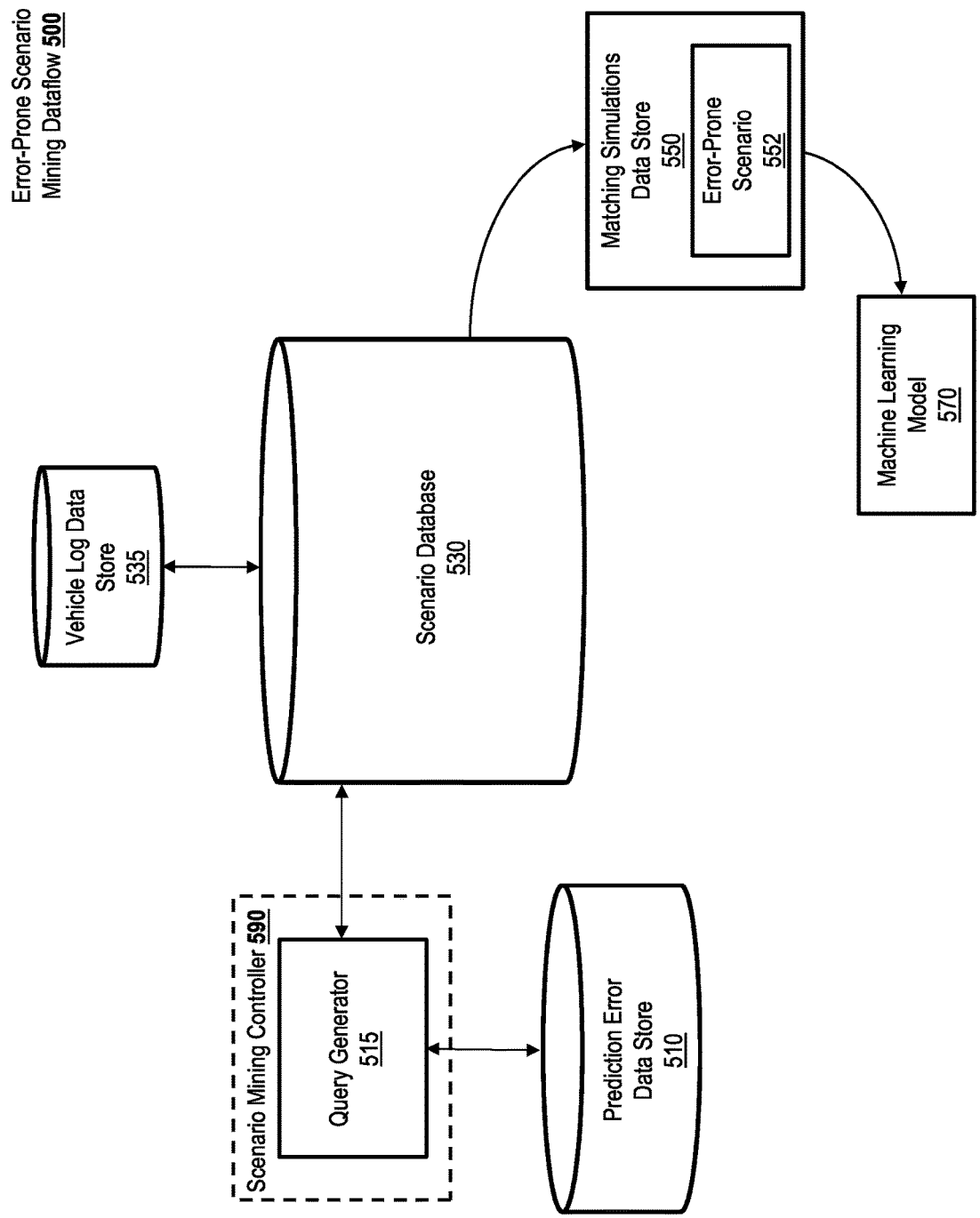
FIG. 5 is a diagram of an implementation of a prediction error scenario mining framework for querying a scenario database to obtain an error-prone scenario.

Referring now to FIG. 5, illustrated is a diagram of an implementation of a prediction error scenario mining framework for querying a scenario database to obtain an error-prone scenario 552. The query generator 515 is configured to generate a search string for the scenario database 530 based on a prediction error from the prediction error data store 510. The query generator 515 may be configured to present a search string to the scenario database 530. The scenario database 530 may include various vehicle scenarios and receive additional vehicle scenarios from a vehicle log data store 535. The scenario database 530 may return a set of matching simulations to the simulations data store 550 that includes an error-prone scenario 552. The error-prone scenario 552 may be indicative of a scenario in which the planned movement decision of the machine learning model 570 is likely erroneous compared to ideal movement decision. The matching scenarios, including the error-prone scenario 552, may be inputted to the machine learning model 570 near an end of the error-prone scenario 552 mining dataflow 500. The machine learning model 570 may be further trained on the error-prone scenario 552 and configured to make updated planned movements for a vehicle. The planned movements or decisions of the machine learning model 570 may be based on predicted movements of objects in the environment, such as an agent vehicle or a bicyclist.

The prediction error data store 510 may include a prediction error for identifying an error-prone scenario 552 in the scenario database 530. The prediction error data store 510 may be configured to store prediction error types and modes related to prediction errors of the machine learning model 570 planning movements for a vehicle. For example, a prediction error mode may include an error type related miscalculating a predicted movement of an approaching agent vehicle during a U-turn that leads to the autonomous vehicle being involved in an accident with the agent vehicle. The prediction error data store 510 may include error-prone modes and the error-prone types that are determined based on known errors that have occurred when prediction errors have occurred in the past, including the prediction errors related to the predicted movements of other vehicles. The error modes and error types may be identified based on the previous decisions by the planning module or machine learning model 570 that caused a driver to intervene. For example, the error modes and error types may be defined by the prediction errors that caused a driver to apply the brakes or rotate the steering wheel. In another example, the error modes or error types may be determined by the prediction errors when a performance evaluator 710 recognizes a difference between a planned decision of an autonomous vehicle and an ideal decision of the autonomous vehicle. The performance evaluator 710 may determine that a final displacement error, a false positive prediction, or a perception-based error exists based on the difference between the planned decision and the ideal decision of the autonomous vehicle.

Error-prone modes and error-prone types may be combined to create error-prone scenarios for further training the machine learning model 570. For example, the "snow" mode may be an error-prone feature for reduced traction combined with a "driving between two 18 wheeler trucks" type may be an error-prone feature for reduced visibility that are combined together to create an enhanced error-prone scenario 552. In another example, the error-prone scenario 552 may include combining an error-prone type that the ego vehicle has a broken sensor with the error-prone mode of the vehicle coasting down a steep hill. The broken sensor combined with the vehicle coasting down a steep hill may cause a prediction error due to the perception error.

The prediction error data store 510 may be configured to pass a prediction error to a query generator 515. In some embodiments, the prediction error data store 510 may be selected to obtain error-prone scenarios. The error-prone scenarios may be desirable to identify to further train the machine learning model 570 and improve the robustness of the machine learning model 570. For example, a desired error-prone scenario may include an ego vehicle that is stopped proximate to a large truck at an intersection including a crosswalk with a pedestrian as the ego vehicle plans to make an unprotected left-hand turn. To capture error-prone scenarios similar to this desired error-prone scenario, the error-prone modes or error-prone types may be selected from the prediction error data store 510 and may include error modes or error types related to predictions of an agent vehicle that is a large truck, a pedestrian detected in a crosswalk at an intersection, and a planned decision to make an unprotected left-hand turn based on movement predictions of other vehicles. In another example, a desired error-prone scenario may include an ego vehicle having an encounter with large animals with unpredictable behavior on country roads at night time. To obtain this desired scenario, the scenario mining controller 590 may select error-prone modes or error-prone types related to night, single-lane highways, and predicting the movement of objects having four legs and facial features. In some embodiments, the prediction error, error-prone mode, or error-mode type may be determined by the scenario mining controller 590 or may be hand-selected to obtain specific error-prone vehicle scenarios.

The query generator 515 may generate a query for the scenario database 530 to identify the error-prone scenario 552. The query generator 515 may be configured to generate a search string based on the prediction error. In some embodiments, the query generator 515 may be configured to generate a search string based on error-prone modes and error-prone types. The query generator 515 may be configured to receive the prediction error as input and generate a search string configured to query the scenario database 530 as output. For example, the query generator 515 may format search strings (e.g., generate Boolean logic, add qualifiers and variables to a function call) and obtain proper syntax for search strings (e.g., identify variables representative of the prediction error) to form a search string that is configured to perform a query at the scenario database 530 based on the prediction error. In some embodiments, the query generator 515 may generate the search string in response to determining the error-prone modes and error-prone types associated with the error-prone scenario 552. In some embodiments, the query generator 515 may generate an SQL query.

The scenario database 530 may be configured to receive a prediction error as input and be configured to return an error-prone scenario 552 based on the prediction error as output. That is, the scenario database 530 may be configured to mine error-prone scenarios based on the prediction error related to movements of objects in the vehicle environment. To facilitate the prediction error scenario mining, the plurality of error-prone scenarios may include metadata for matching prediction errors from the search string to the error-prone scenario 552. For example, the scenario database 530 receives the following error modes and types: predicted movements of an agent vehicle that is a large truck, a pedestrian detected in a crosswalk at an intersection, and a planned decision to make an unprotected left-hand turn. The scenario mining controller 590 may search through the scenario database 530 to identify an error-prone scenario 552 having metadata that includes an ego vehicle that is stopped proximate to a large truck at an intersection including a crosswalk with a pedestrian as the ego vehicle plans to make an unprotected left-hand turn. In another example, the scenario mining controller 590 searches through the scenario database 530 to identify the error-prone scenario 552 having metadata that includes nighttime conditions, single-lane highways, and predicting the movement of objects having facial features and four-legs.

The scenario database 530 may include a plurality of error-prone scenarios in which each error-prone scenario 552 includes vehicle sensor data associated with one or more timeframes. The plurality of error-prone scenarios may be obtained from a vehicle log data store 535, a simulator, or a combination thereof. For example, an error-prone scenario 552 is based on an actual driving environment and sensor data but may include artificially inserted walls or obstacles. An error-prone scenario 552 may include a plurality of datasets representative of data received from an autonomous vehicle sensor system including a LIDAR sensor dataset, camera sensor dataset, RADAR sensor dataset, telemetrics sensor dataset, and other ego vehicle sensor datasets. In some embodiments, the scenario database 530 may include the presence of a sensor in the metadata or a value of the sensor in the metadata. The scenario mining controller 590 may be configured to search for the presence and a threshold value of a sensor based on a prediction error associated with the sensor. In some embodiments, the scenario database 530 may comprise an SQL database and the scenario database 530 may be configured to carry out the SQL query.

The vehicle log data store 535 may include data logged by an autonomous vehicle. The logged data may include data that has not yet been tagged with metadata and uploaded to the scenario database 530. The scenario database 530 may be updated by the vehicle log data store 535 with new scenarios. The scenario mining controller 590 may be configured to add metadata to error-prone scenarios from the vehicle log data store 535 to update the scenario database 530 based on new environments the vehicle has been in or simulations in which the machine learning model 570 has been trained. The data in the vehicle log data store 535 may include data from the autonomous vehicle sensor system that is representative of an environment surrounding the autonomous vehicle.

The matching simulations data store 550 may include a subset of the plurality of error-prone scenarios having metadata matching the prediction error received by the scenario database 530. The subset of the plurality of error-prone scenarios may include the error-prone scenario 552. The error-prone scenario 552 may be a scenario in which the planning movements of the machine learning model 570 are faulty based on a displacement error threshold related to a predicted movement of another vehicle by the machine learning model 570. For example, the displacement error threshold includes a quantitative threshold representative of a distance between the planned movements and the ideal movements of the machine learning model 570 based on the predicted movements of the nearby vehicle. The error-prone scenario 552 may be a scenario in which the planning movements of the machine learning model 570 are uncertain or faulty based on a timing error threshold related to a movement of another vehicle. For example, the timing error threshold includes a quantitative threshold representative of a timing between the planned movements and the ideal movements of the machine learning model 570 based on the predicted movements of the nearby vehicle. The error-prone scenario 552 may be a scenario in which the planning movements of the machine learning model 570 are uncertain or faulty based on a perception threshold. For example, the perception threshold includes a quantitative threshold representative of a difference between the perception of the machine learning model 570 in the error-prone scenario 552 compared to the perception of the machine learning model 570 in an ideal driving scenario.

The subset of the plurality of error-prone scenarios may be inputted to the machine learning model 570. In some embodiments, the scenario mining controller 590 may obtain the error-prone scenario 552 from the scenario database 530 for inputting into the machine learning model 570 for training the machine learning model 570. The machine learning model 570 may be configured to make the planned movements for the autonomous vehicle and may be an online perception model or an offline perception model.

Figure 6:
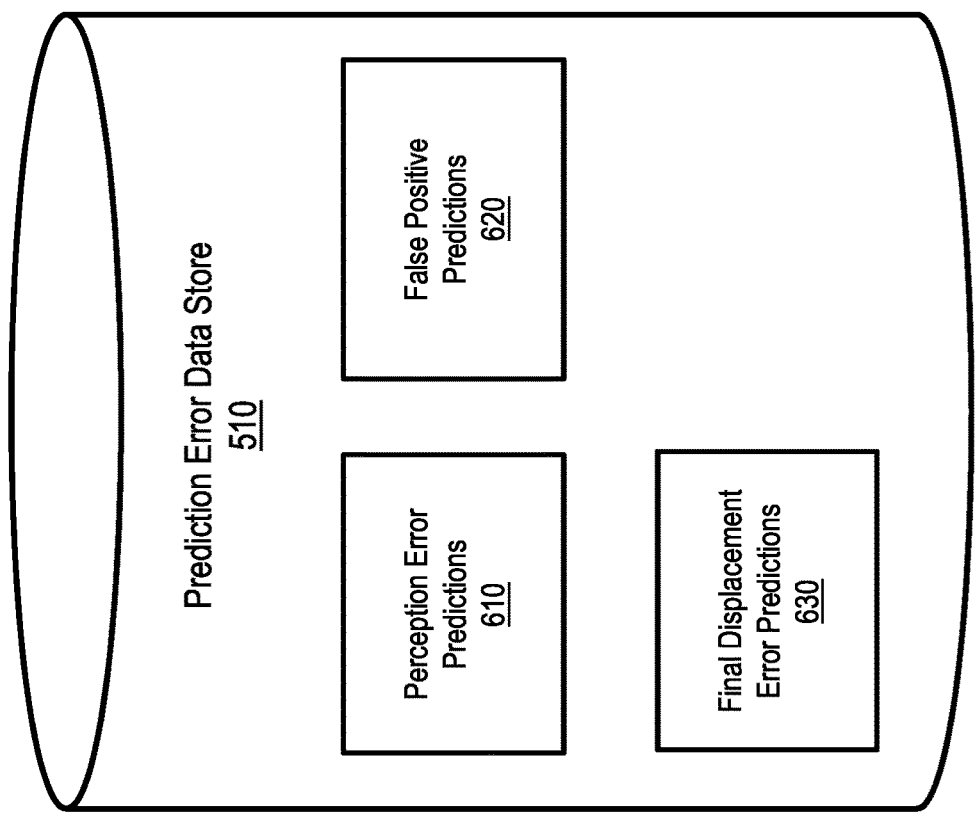
FIG. 6 is a diagram of an implementation of a prediction error data store.

Referring now to FIG. 6, illustrated is a diagram of an implementation of a prediction error data store. The prediction error data store 510 may include a set of attributes for identifying an error-prone scenario 552 in the scenario database 530. The prediction error data store 510 may be configured to store prediction errors related to miscalculations made by the machine learning model 570 related to planned decisions of the autonomous vehicle in the environment. The miscalculations of the prediction errors may be determined by comparing the planned movement of the machine learning model 570 to the ideal movement of the autonomous vehicle based on the predicted movements of other vehicles by the machine learning model 570. The prediction error data store 510 may organize the prediction errors into different types of miscalculations. For example, the types of prediction errors or miscalculations includes perception error predictions 610, false-positive predictions 620, and final displacement error predictions 630.

The prediction error data store 510 may include perception error predictions 610. Perception error predictions 610 may be selected to obtain error-prone scenarios 552 including a miscalculation due to misperception by a sensor in the autonomous vehicle sensor system. For example, a camera in the autonomous vehicle sensor system is oversaturated by sun exposure that causes a miscalculation in the planning of an unprotected left-hand turn. To capture error-prone scenarios matching or similar to this desired scenario, the prediction error selected may include sensor data that is incorrect or sensor data that is incomplete. In another example, a desired error-prone scenario includes a LIDAR sensor broken with no data output or a corrupted data output that causes the planned timing of movements by the machine learning model 570 to be miscalculated for high-speed agent vehicles.

The prediction error data store 510 may include false-positive predictions 620. False-positive predictions 620 may be selected to obtain error-prone scenarios 552 including a miscalculation due to an incorrectly analyzing input from the data sensors at the machine learning model 570 that cause an unnecessary movement. For example, the machine learning model 570 misinterprets data from the sensors to detect a stop sign rather than a flagpole that causes the machine learning model 570 to plan an unnecessary stop rather than to proceed through the intersection. To capture error-prone scenarios matching or similar to this desired scenario, the prediction error selected may include misinterpreted data that leads to an outcome having unnecessary vehicle movements. False-positive predictions 620 may be selected to obtain error-prone scenarios 552 including a miscalculation of a predicted movement of an object that causes an unnecessary movement planned by the machine learning model 570. For example, a desired error-prone scenario includes the miscalculation of a predicted movement of an approaching bicyclist traveling in the opposite direction that causes an unnecessary turn planned by the machine learning model 570.

The prediction error data store 510 may include final displacement error predictions 630. Final displacement error predictions 630 may be selected to obtain error-prone scenarios 552 including a miscalculation in the planned movement by the machine learning model 570 relative to the ideal movement in the metadata resulting in the autonomous vehicle moving to a location other than the desired location. For example, the machine learning model 570 miscalculates the distances needed to parallel park, causing the planned movements of the autonomous vehicle to be a distance from the ideal movement of the autonomous vehicle needed to parallel park. To capture error-prone scenarios matching or similar to this desired scenario, the prediction error selected may include bad calculations leading to planned outcome different from an ideal outcome. Final displacement error predictions 630 may be selected to obtain error-prone scenarios 552 including a miscalculation in the predicted movement of other objects by the machine learning model 570 relative to the ideal movement prediction of other objects. For example, a desired error-prone scenario includes the miscalculation of a predicted movement of an approaching bicyclist traveling in the opposite direction during an unprotected left-hand turn that causes a miscalculation in the movement by the machine learning model 570 and cause a collision with the approaching bicyclist.

In some embodiments, the prediction error may be selected based on the prediction error satisfying a miscalculation threshold. The miscalculation threshold may be indicative that the machine learning model 570 is to be retrained based on the error-prone scenario 552. For example, the scenario mining controller 590 selects a final displacement error prediction in which the planned decision by the machine learning model 570 is at least five feet from the ideal trajectory of the autonomous vehicle. In another example, the scenario mining controller 590 selects a false positive prediction in which the unnecessary movement by the machine learning model 570 causes the vehicle to decelerate at a rate of more than five miles per hour per second. The scenario mining controller 590 may obtain the error-prone scenario 552 from the scenario database for inputting into the machine learning model 570 in response to the prediction error satisfying the miscalculation threshold.

Figure 7:
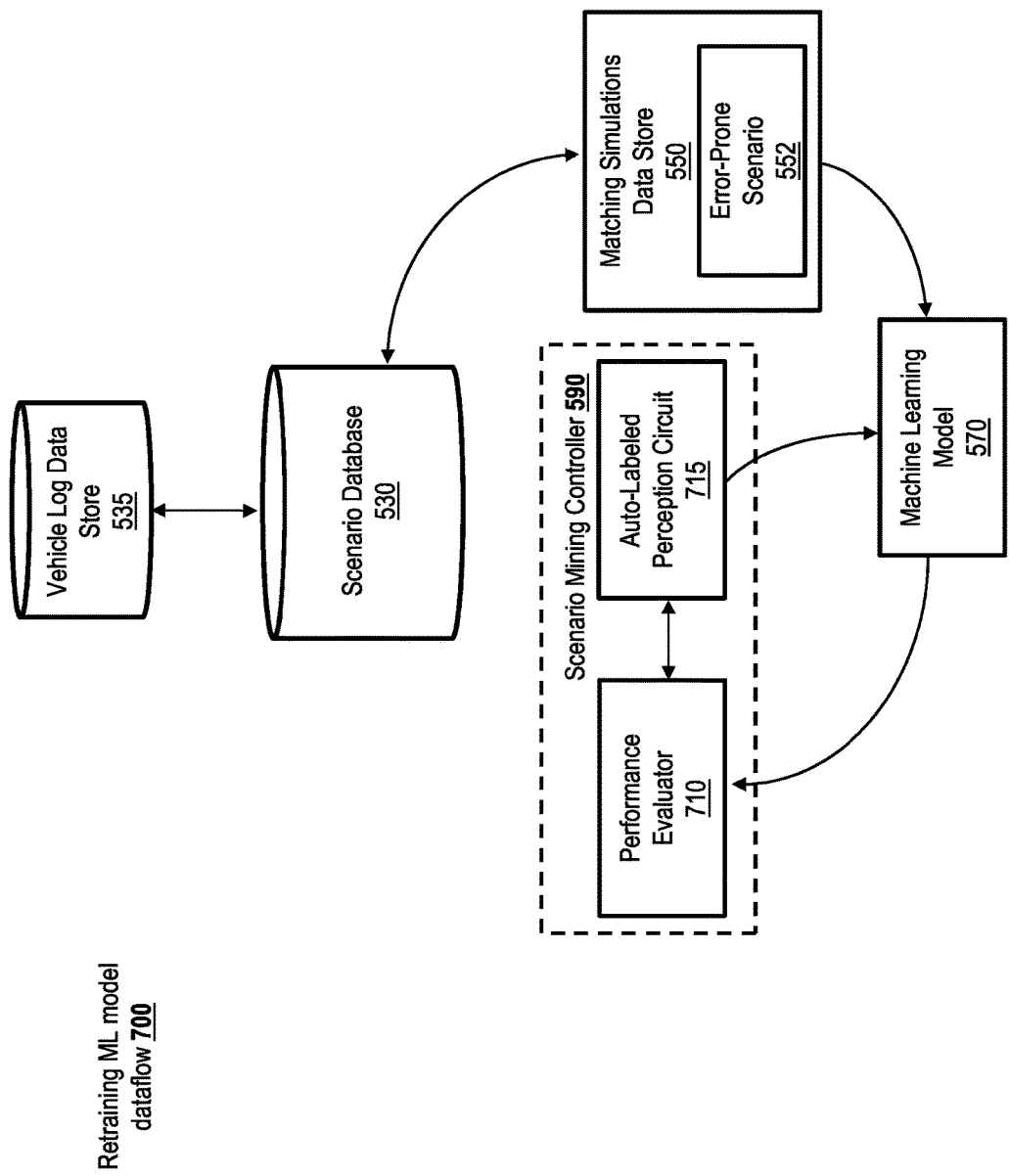
FIG. 7 is a diagram of an implementation of a process for determining whether to retrain a machine learning model based on running the error prone scenario with an auto-labeled perception.

Referring now to FIG. 7, illustrated is a diagram of an implementation of a process for determining whether to retrain the machine learning model 570 based on running the error prone scenario with an auto-labeled perception. The scenario database 530 may return a set of matching simulations to the simulations data store 550 that includes an error-prone scenario 552. The error-prone scenario 552 may be indicative of a scenario in which the planned movement decision of the machine learning model 570 is likely erroneous compared to an ideal movement decision. The ideal movement decision may include the correctly predicted movement of a nearby vehicle or object. The matching scenarios, including the error-prone scenario 552, may be inputted to the machine learning model 570. The performance evaluator 710 may determine the presence of a miscalculation and a value representative of the miscalculation. The performance evaluator 710 may determine that the machine learning model 570 may run the error-prone scenario 552 with an improved auto-labeled perception. The performance evaluator 710 may determine the miscalculation in the error-prone scenario 552 is mitigated by running the error-prone scenario 552 with the improved auto-labeled perception. The scenario mining controller 590 may retrain the machine learning model 570 with the improved auto-labeled perception based on the mitigated miscalculation in the error-prone scenario 552.

The scenario mining controller 590 may be configured to retrain the machine learning model 570 based on the improved auto-labeled perception for error-prone scenarios. Auto-labeling an error-prone scenario 552 where prediction resulted in a miscalculation improves the planned movements and prediction metrics of the machine learning model 570. The retraining machine learning model dataflow 700 may be performed when the prediction error or miscalculation of an error-prone scenario 552 satisfies a miscalculation threshold, a difficulty threshold, or a safety threshold. More specifically, the performance evaluator 710 may determine whether the prediction error or miscalculation of an error-prone scenario 552 satisfies a miscalculation threshold, a difficulty threshold, or a safety threshold.

The performance evaluator 710 may be configured to run the machine learning model 570 on the error-prone scenario 552 with an improved auto-labeled perception from auto-labeled perception circuit 715. The improved auto-labeled perception may include the ideal planned movement for the error-prone scenario 552. For example, the improved auto-labeled perception includes an auto-labeled trajectory of the autonomous vehicle when a sensor is oversaturated by the sun or the auto-labeled mapping of a detected flag to a flag rather than a stop sign. In another example, the improved auto-labeled trajectory includes an auto-labeled timing of making an unprotected turn for the autonomous vehicle when predicting the movement of a bicyclist approaching in the opposite direction.

The performance evaluator 710 may be configured to determine whether the machine learning model 570 improves performance, eliminates the prediction error, and mitigates the miscalculation based on running the error-prone scenario 552. The performance evaluator 710 may determine an updated prediction error of the error-prone scenario 552 in response to running the error-prone scenario 552 with the improved auto-labeled perception. For example, the performance evaluator 710 determines an updated prediction error for the error-prone scenario 552 based on running the auto-labeled trajectory when the sensor is oversaturated by the sun or the updated prediction error for the error-prone scenario 552 for running the auto-labeled mapping for the detected flag. In another example, the performance evaluator 710 determines an updated prediction error for the error-prone scenario 552 based on running the auto-labeled timing of making an unprotected turn for the autonomous vehicle when predicting the movement of the bicyclist approaching in the opposite direction.

The performance evaluator 710 may determine the updated prediction error based on the improved auto-labeled perception is lower than the original prediction error. For example, the performance evaluator 710 determines the updated prediction error based on the improved auto-labeled perception for the error-prone scenario 552 of the sun oversaturating a camera is lower than the prediction error was beforehand. In response to determining the updated prediction error is lower than the original prediction error, the scenario mining controller 590 retrains the machine learning model 570 with the improved auto-labeled perception.

Figure 8:
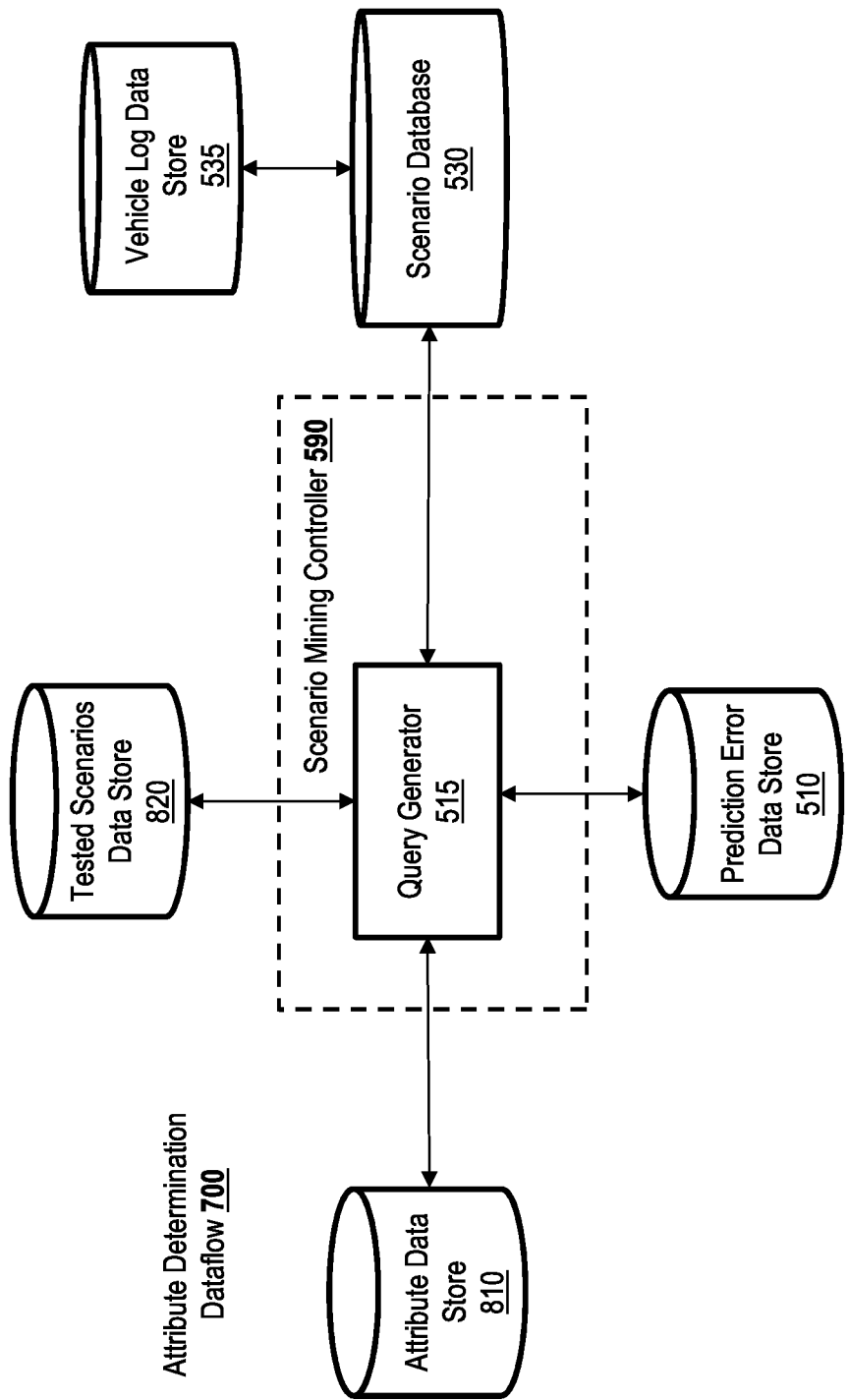
FIG. 8 is a diagram of an implementation of a process for determining a set of attributes to present to a scenario database.

Referring now to FIG. 8, illustrated is a diagram of an implementation of a process for determining a set of attributes to present to a scenario database 530. The query generator 515 may be configured to generate a search string for the scenario database 530 based on the prediction error and a set of attributes from the attribute data store 810. The scenario database 530 may search for a set of matching simulations, including the error-prone scenario 552 based on the prediction error and the set of attributes.

The attribute data store 810 may include a set of attributes for identifying an error-prone scenario 552 in the scenario database 530. The attribute data store 810 may be configured to store attributes related to driving in a vehicle environment. The attribute data store 810 may include conditions and features that are characteristic of environments that a vehicle may encounter. Conditions and features may be combined to create vehicle scenarios for further training the machine learning model 570. For example, the "snow"

attribute is a condition and a "driving between two 18 wheeler trucks" feature may be two attributes combined together to create a vehicle scenario. In another example, the vehicle scenario includes combining a condition that the ego vehicle has a broken sensor with the feature of the vehicle coasting down a steep hill.

The attribute data store 810 may be configured to pass a set of attributes to a query generator 515. In some embodiments, the attributes in the attribute data store 810 may be selected to obtain a specific error-prone scenario beyond what the prediction error may specify. The specific error-prone vehicle scenarios may be desirable to further train the machine learning model 570. For example, a desired error-prone scenario includes an ego vehicle that is driving proximate to a large truck as the ego vehicle and predicting the movements of the large truck approaching a crosswalk with a pedestrian and a stroller. To capture vehicle scenarios similar to this desired scenario, the attributes selected from the attribute data store 810 may include predicted movements of an agent vehicle that is a large truck, a pedestrian detected in the crosswalk, a stroller detected in the crosswalk, and the ego vehicle is 30 feet away from the crosswalk. In another example, a desired vehicle scenario untested by the machine learning model 570 includes an ego vehicle predicting the movements of large animals on country roads at night time. To obtain this desired scenario, the query include attributes for a desired scenario that includes a night attribute, a single-lane highway attribute, and an animal movement prediction attribute.

The set of attributes may be selected by examining the training history of the machine learning model 570. The training history of the machine learning model 570 may be stored in the tested scenarios data store 820. The tested scenarios data store 820 may include the scenarios used to test the machine learning model 570. The tested scenarios data store 820 may be queried to determine whether a set of attributes is to return a specific error-prone vehicle scenario.

The set of attributes may be determined by a frequency at which the attribute or the combination of attributes has been tested by the machine learning model 570 or the test history is recorded in the tested scenarios data store 820. The scenario mining controller 590 may determine whether a potential attribute should be tested by evaluating the frequencies at which each potential attribute or combination of potential attributes has been tested by the machine learning model 570 or the test history is recorded in the tested scenarios data store 820. The scenario mining controller 590 may compare the test frequencies of two or more potential attributes to assist in identifying the specific error-prone scenarios. The attributes with the lower test frequency may be selected to identify the untested, rare, and edge-case scenarios.

In comparing the two or more potential attributes, the scenario mining controller 590 may determine a first test frequency for which the machine learning model 570 has made the planned movements for the autonomous vehicle based on a first potential attribute. For example, the scenario mining controller 590 determines the number of times (i.e., first test frequency) the planning system 404 has been presented with predicting nearby vehicle movements during an unprotected right-hand turn (i.e., the first potential attribute). The scenario mining controller 590 may determine a second test frequency for which the machine learning model 570 has made the planned movements for the autonomous vehicle based on a second potential attribute. For example, the scenario mining controller 590 determines the number of times (i.e., second test frequency) the planning system 404 has been presented with predicting nearby vehicle movements during an unprotected left-hand turn (i.e., the second potential attribute). The scenario mining controller 590 may determine the second test frequency is lower than the first test frequency and select the second potential attribute to add to the set of attributes based on the second test frequency being lower than the first test frequency.

In some other embodiments, the scenario mining controller 590 may determine a test frequency threshold representative of the minimum number of times an attribute is to be exposed to the machine learning model 570 in order to be fully trained. The scenario mining controller 590 may search through the potential attributes and determine that a second attribute fails to satisfy a test frequency threshold and that a first potential attribute satisfies the test frequency threshold. In response to the second attribute failing to satisfy the test frequency threshold, the scenario mining controller 590 may select the second potential attribute as the attribute to be used to search for a specific error-prone scenario.

The set of attributes may be determined by a difficulty level associated with the potential attribute or the combination of potential attributes. The difficulty rating may be representative of the amount of information and computations needed to complete the planned movement safely. The difficulty rating may be representative of the difficulty for the machine learning model to predict the planned movements of a nearby object (e.g., an agent vehicle). The scenario mining controller 590 may determine whether a potential attribute should be tested by evaluating the difficulty rating of the potential attribute or the combination of potential attributes. The scenario mining controller 590 may determine whether combining a potential attribute with another potential attribute increases or decreases the difficulty rating associated with the combination of attributes. The scenario mining controller 590 may compare the difficulties of two or more potential attributes to assist in identifying the untested, rare, and edge-case scenarios. The attributes with the higher difficulty rating may be selected to identify the specific error-prone scenarios. In some embodiments, the difficulty rating may be affected by a safety threshold or rating of a vehicle maneuver or environment.

In comparing the two or more potential attributes, the scenario mining controller 590 may determine a first difficulty rating for the machine learning model 570 to make the planned movements for the autonomous vehicle based on a first potential attribute. For example, the scenario mining controller 590 determines the difficulty rating based on the first potential attribute that is representative of the information and computations necessary for the machine learning model 570 to navigate the vehicle through an unprotected right-hand turn. The scenario mining controller 590 may determine a second difficulty rating for the machine learning model 570 to make the planned movements for the autonomous vehicle based on a second potential attribute. For example, the scenario mining controller 590 determines the difficulty rating based on the second potential attribute that is representative of the information and computations necessary for the machine learning model 570 to navigate the vehicle through an unprotected left-hand turn based on the predicted movements of other vehicles. The scenario mining controller 590 may determine the second difficulty rating is greater than the first difficulty rating and select the second potential attribute (e.g., navigating an unprotected left-hand turn based on the predicted movements of other vehicles) to add to the set of attributes based on the second difficulty being greater than the first difficulty.

Figure 9:
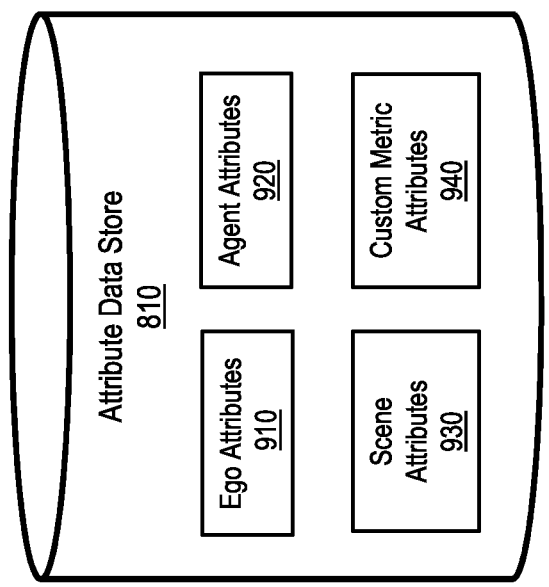
FIG. 9 is a diagram of an implementation of an attribute data store.

Referring now to FIG. 9, illustrated is a diagram of an implementation of an attribute data store 810. The attribute data store 810 may include a set of attributes for identifying an error-prone scenario 552 in the scenario database 530. The attribute data store 810 may be configured to store attributes related to driving in a vehicle environment. The attribute data store 810 may organize attributes relevant to the vehicle, the environment surrounding the vehicle, or the objects in the environment surrounding the vehicle. For example, the types of attributes include ego attributes 910, agent attributes 920, scene attributes 930, and custom metric attributes 940.

The attribute data store 810 may include ego attributes 910. Ego attributes 910 may include any features or characteristics of the ego vehicle. For example, the ego attribute is a body style (e.g., a truck, a boat) or a means of powering (e.g., a gasoline-powered vehicle, an electric-powered vehicle). In some embodiments, the ego attribute may be representative of a characteristic of the autonomous vehicle. For example, the ego vehicle has a wheelbase, a track, a height, a speed, a distance between the ego vehicle and the obstacle, and a turning radius. The ego vehicle may have various sensors including LiDAR sensors, radar sensors, microphones, inertial measurement units (IMUs), a GPS receiver, and real-time kinematics (RTK) receivers. Other ego attributes 910 may include Global Navigation Satellite System (GNSS) data, the latitude and longitude of the vehicle, or a state where the vehicle is licensed.

The attribute data store 810 may include agent attributes 920. Agent attributes 920 may include any feature or characteristic capable of movement on its own, such as a proximate vehicle or an agent vehicle. For example, an agent vehicle is a motorcycle, scooters, a waverunner, an 18-wheel semitruck, a cargo van, a bicycle, and/or the like. The agent attributes 920 may be representative of a characteristic of the agent vehicle. For example, the agent vehicle has a wheelbase, a track, a height, a speed, a distance between the ego vehicle and the obstacle, and a turning radius. The agent attribute may also be an object that moves, such as a pedestrian, a large animal, and a cardboard box blowing in the wind. In some embodiments, the agent attribute may be representative of a moving obstacle proximate to the autonomous vehicle.

The attribute data store 810 may include scene attributes 930. For example, the scene attributes 930 include road conditions and weather conditions. Road conditions may include an elevation, a hill steepness, a construction zone, a crosswalk, a stoplight, an HOV lane, a median, a traffic speed, a traffic volume, a number of vehicular and cyclist traffic lanes, a lane width, lane traffic directions, lane marker types, or a combination thereof. Weather conditions may include rainy conditions, snowy conditions, fog, and thunderstorms. In some embodiments, a scene attribute may be representative of an environmental obstacle proximate to the autonomous vehicle. Other examples of scene attributes include a parked vehicle, an object in the roadway, an upcoming intersection, traffic conditions, roadway conditions, construction conditions, intersection conditions, pedestrians, an emergency siren, and/or the like.

The attribute data store 810 may include custom metric attributes 940. Custom metric attributes 940 may include any feature or characteristic of the behavior of the ego vehicle. For example, the ego vehicle behaves with a brake tap, a gradual coasting stop, cruise control, and the like. Other custom metric attributes 940 may include headlights on, left turns, right turns, a malfunctioning sensor, a hacked software, pixel noise at the camera, a false tracked object. These behaviors of the ego vehicle may be added to further determine how the machine learning model 570 responds.

The attribute data store 810 may be configured to pass the prediction error and the set of attributes to a query generator 515. In some embodiments, the attributes in the attribute data store 810 may be selected to obtain specific error-prone scenarios. The error-prone scenario may include incorrectly predicted movements of other objects in the environment. The specific error-prone scenarios may be desirable to identify to further train the machine learning model 570. For example, a desired error-prone scenario includes an ego vehicle that is driving proximate to a large truck as the ego vehicle and the large truck approach a crosswalk with a pedestrian and a stroller. To capture vehicle scenarios matching or similar to this desired scenario, the attributes selected from the attribute data store 810 may include a large truck as an agent vehicle, a pedestrian detected in the crosswalk, a stroller detected in the crosswalk, and the ego vehicle is 30 feet away from the crosswalk. In another example, a desired error-prone scenario includes an ego vehicle predicting the movements of large animals on country roads at night time. To obtain this desired scenario, the scenario mining controller 590 may select attributes related to nighttime, single-lane highways, and predicting the movement of objects having facial features and four-legs.

Figure 10A:
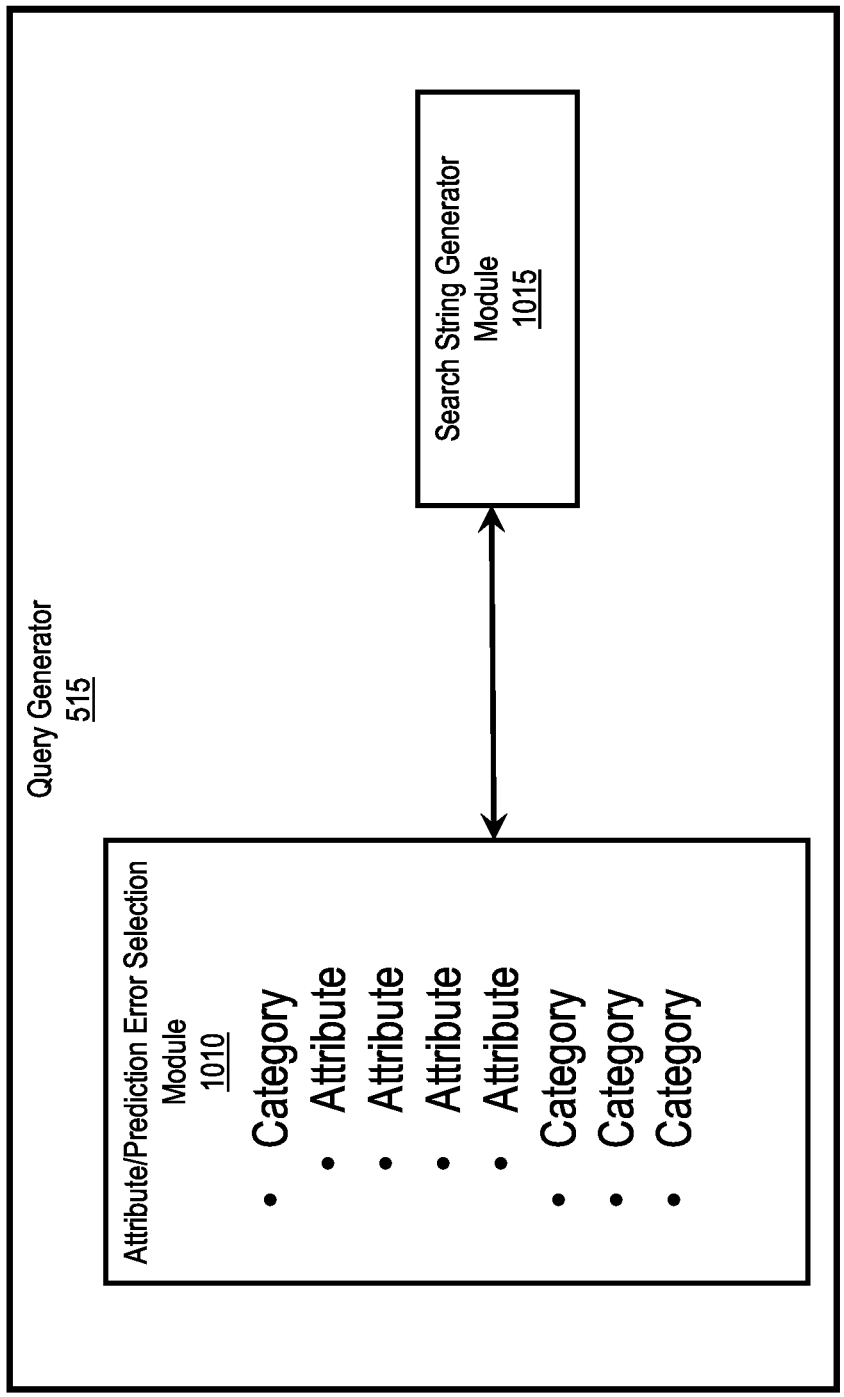
FIG. 10A is a diagram of an implementation of a user interface for generating a search string for querying the scenario database.

Referring now to FIG. 10A, illustrated is a diagram of an implementation of a user interface for generating a search string for querying the scenario database 530. The user interface may be representative of how the prediction errors and attributes are organized and how the search string may be generated. Selecting a prediction error and attribute may enable the scenario mining controller 590 to search through the scenario database 530 using the generated search string without a human manually searching through the scenario database 530.

The attribute/prediction error selection module 1010 may present a set of categories representative prediction errors and attributes having a characteristic of the category. For example, a set of categories includes ego-level attributes, agent-level attributes, scenario-level attributes, custom metrics attributes, and ML model attributes. Within a category, such as the ego-level attributes category, attributes may share a common feature or descriptor. For example, the ego-level attributes category includes an ego vehicle speed, a turning radius, a distance between the ego vehicle and an obstacle, a wheelbase, a track, a height, and a maximum deceleration. The set of categories may expand to reveal a list of prediction errors and attributes that share a common characteristic. For example, a category is selected and a drop-down menu is generated including a list of corresponding prediction errors and attributes sharing a similar characteristic with the category. A prediction error and an attribute may be selected from the attribute/prediction error selection module 1010 for generating a search string configured to identify error-prone scenarios having the prediction error.

The search string generator module 1015 may be configured to receive an attribute from the attribute/prediction error selection module 1010 and generate a search string based on the prediction error or attribute. The search string generator module 1015 may be configured to format search string code and obtain proper syntax capable of performing the query. For example, the search string generator module 1015 is configured to add Boolean logic and add qualifiers and variables to a function call within the search string. In another example, the search string generator module 1015 is configured to obtain variables representative of the function call and determine threshold values indicative of constraints needed in the desired vehicle scenario. The search string generator module 1015 may be configured to rearrange query code as needed when attributes are added or removed.

In some embodiments, the search string generator module 1015 may be configured to generate SQL code. For example, the search string generator module 1015 generates the following example SQL query "SELECT log_name, sample_token, timestamp FROM agent_prod.all WHERE length>7 AND agent_type='CAR' AND is_ahead_of_ego=TRUE AND euclidean_distance_to_ego<30.0." The example search string may be generated in response to adding a "large truck" attribute to the search string generator module 1015 that is less than 30 feet in front of the ego vehicle.

Figure 10B:
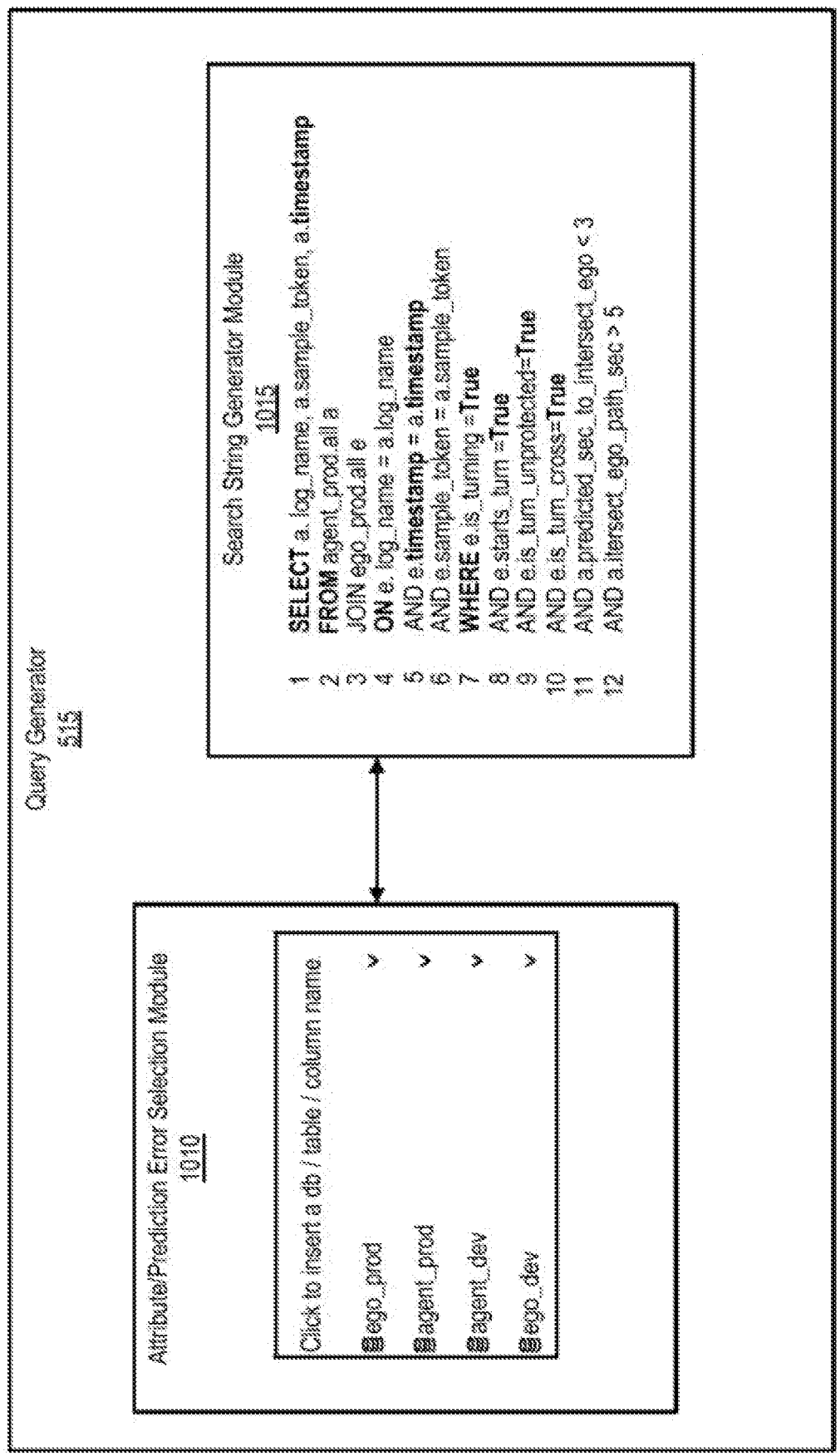
FIG. 10B is a diagram of another implementation of the user interface for generating the search string for querying the scenario database.

Referring now to FIG. 10B, illustrated is a diagram of another implementation of the user interface for generating the search string for querying the scenario database 530. The user interface may include an attribute/prediction error selection module 1010 and a search string generator module 1015. The attribute/prediction error selection module 1010 may present a set of categories representative of prediction errors and attributes having the characteristic of the category. The search string generator module 1015 may be configured to receive a prediction error and an attribute from the attribute/prediction error selection module 1010 and generate a search string.

Figure 11:
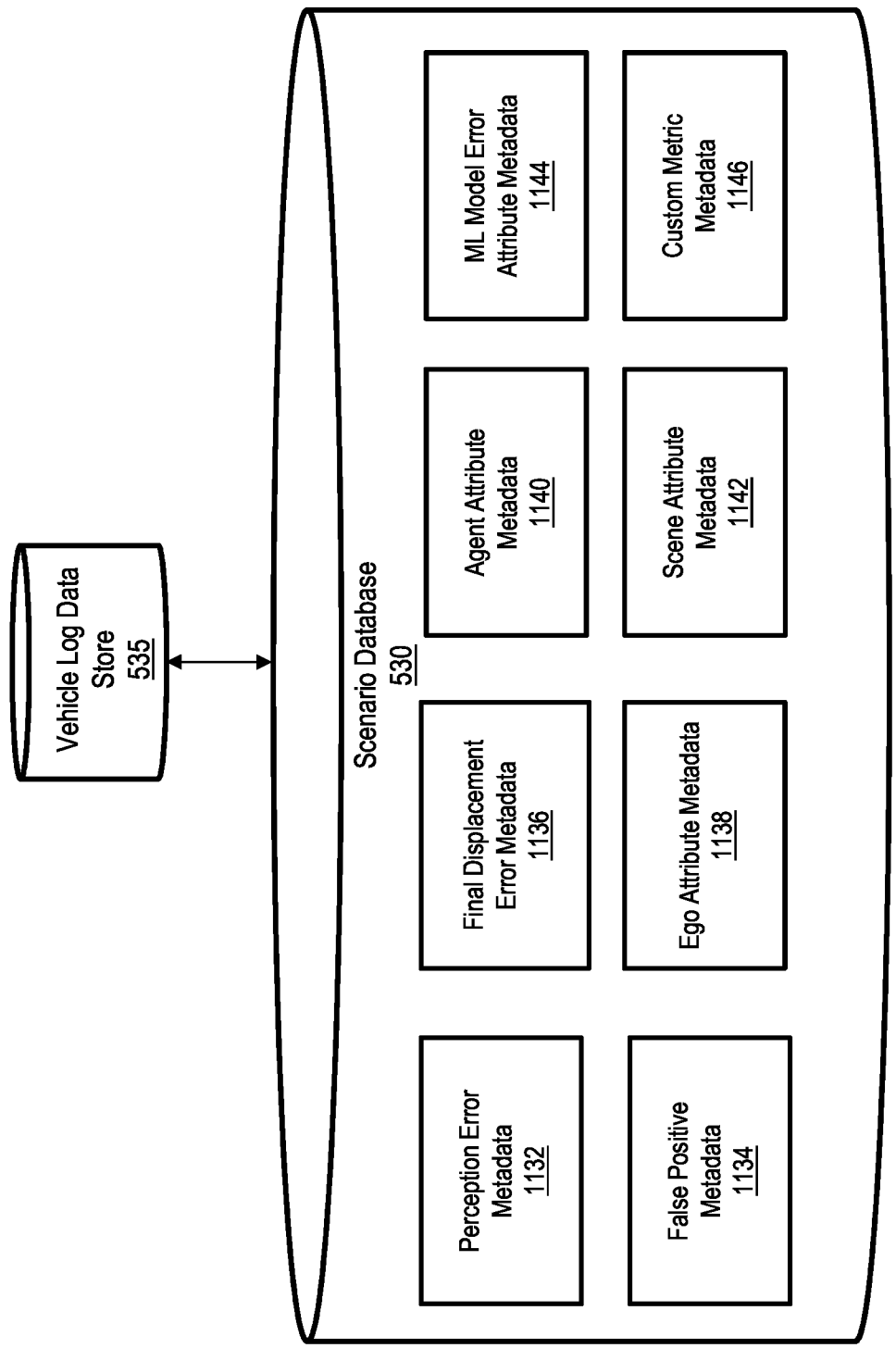
FIG. 11 is a diagram of an implementation of a scenario database.

Referring now to FIG. 11, illustrated is a scenario database 530. A scenario database 530 is searched to identify error-prone scenario 552 based on a prediction error and/or an attribute. The scenario database 530 includes a plurality of datasets marked with at least one prediction error to facilitate scenario mining. The scenario database 530 may be configured to receive a prediction error and set of attributes as input and be configured to return an error-prone scenario 552 as output. That is, the scenario database 530 may be configured to mine vehicle scenarios based on the prediction error and the set of attributes. To facilitate the prediction error scenario mining, the plurality of scenarios may include metadata for matching attributes from the search string to the error-prone scenario 552. Without the scenario database 530, brute force training, and experimentation would be the costly and inefficient alternative for the creation of safe and comprehensive autonomous vehicle machine learning models.

The scenario database 530 may be constructed based on logged driving experiences from the vehicle log data store 535. The scenario database 530 may be configured to label datasets from the vehicle log data store 535 with metadata representative of the features or behaviors in the dataset. The labeled datasets from the vehicle log data store 535 may be stored in the scenario database 530 as a vehicle scenario. The vehicle scenarios may be organized into framesets that includes a plurality of frames that have a discrete timestamp and metadata attached.

The vehicle scenarios in the scenario database 530 may include datasets with metadata. The datasets may include data from the autonomous vehicle sensor system that is representative of an environment surrounding the autonomous vehicle. The autonomous vehicle sensor system may include a LIDAR sensor dataset, camera sensor dataset, RADAR sensor dataset, telemetrics sensor dataset, and other ego vehicle sensor datasets. In some embodiments, the sensor data may be simulated. The metadata labels attached to the vehicle scenarios may include perception error metadata 1132, false-positive metadata 1134, final displacement error metadata 1136, ego attribute metadata 1138, agent attribute metadata 1140, the scene attribute metadata 1142, machine learning model error attribute metadata 1144, and custom metric attribute metadata 1146.

The perception error metadata 1132 may be added to a dataset including data from the autonomous vehicle sensor system. The perception error metadata 1132 may include the presence of a miscalculation in the planned movement by the machine learning model 570 in the metadata due to limited perception and a value representative of a miscalculation in the planned movement by the machine learning model 570 due to the limited perception. For example, the perception error metadata 1132 includes metadata indicating that the vehicle has a miscalculated U-turn caused by limited perception and a value in the metadata representative of the miscalculation of the planned movement by the machine learning model 570 relative to the ideal movement. The perception error metadata 1132 may be added or removed between different framesets. For example, the perception error metadata 1132 is not attached to the framesets in which no U-turn is taking place. In another example, perception error metadata 1132 is added to framesets in which the vehicle is making a U-turn.

The false-positive metadata 1134 is added to a dataset including data from the autonomous vehicle sensor system. The false-positive metadata 1134 includes the presence of a miscalculation in the planned movement by the machine learning model 570 relative to the ideal movement in the metadata caused by unnecessary movement or brake tap and a value representative of a miscalculation in the planned movement by the machine learning model 570 caused by an unnecessary movement or brake tap. For example, the false-positive metadata 1134 includes metadata indicating that the vehicle has a brake tap caused by a false perception of a stop sign and a value in the metadata representative of the miscalculation of the planned movement by the machine learning model 570 relative to the ideal movement of not stopping. The false-positive metadata 1134 may be added or removed between different framesets. For example, the false-positive metadata 1134 is not attached to the framesets in which no false movements in response to a stop sign take place. The false-positive metadata 1134 includes the presence of a miscalculation of a predicted movement of an object that cause an unnecessary movement planned by the machine learning model 570. In another example, false-positive metadata 1134 is added to framesets in which the vehicle is falsely predicting the movement of an approaching bicyclist.

The final displacement error metadata 1136 may be added to a dataset including data from the autonomous vehicle sensor system. The final displacement error metadata 1136 may include the presence of a miscalculation in the planned movement by the machine learning model 570 relative to the ideal movement in the metadata resulting in the autonomous vehicle moving to a location other than the desired location. The final displacement error metadata 1136 may include a value representative of a miscalculation in the planned movement by the machine learning model 570 that is the difference between the planned movement and the ideal movement. For example, the final displacement error metadata 1136 includes metadata indicating that the vehicle has improperly parallel parked and a value in the metadata representative of the distance in the miscalculation of the parallel parking by the machine learning model 570 relative to the ideal parallel parking. The final displacement error metadata 1136 may be added or removed between different framesets. For example, the final displacement error metadata 1136 is not attached to the framesets in which no miscalculated movements occurred in response to parallel parking. The final displacement error metadata 1136 may include the presence of a miscalculation in the predicted movement of other objects by the machine learning model 570 relative to the ideal movement prediction of other objects. For example, final displacement error metadata 1136 is added to framesets in which the vehicle is incorrectly predicts the movements of vehicles behind the autonomous vehicle while parallel parking the autonomous vehicle.

The ego attribute metadata 1138 may be added to a dataset including data from the autonomous vehicle sensor system. The ego attribute metadata 1138 may include the presence of a sensor in the metadata and a value representative of data gathered by the sensor related to the ego vehicle. For example, the ego attribute metadata 1138 includes metadata indicating that the vehicle has a speed sensor and a value in the metadata representative of the speed of a vehicle within a particular frame or frameset. The ego attribute metadata 1138 may be added or removed between different framesets. For example, the ego attribute metadata 1138 for the speed sensor is not attached to the framesets in which the vehicle is idle. In another example, braking sensor metadata and a metadata value indicative of a rate at which the vehicle is decelerating may be added to framesets in which the vehicle is braking.

The agent attribute metadata 1140 may be added to a dataset including data from the autonomous vehicle sensor system. The agent attribute metadata 1140 may include the presence of a sensor in the metadata and a value representative of data gathered by the sensor related to moving objects around the vehicle. For example, the agent attribute metadata 1140 includes metadata indicating that a tractor is approaching in the opposite direction over an overpass within a particular frameset. The agent attribute metadata 1140 may be added or removed between different framesets. For example, the agent attribute metadata 1140 recognizing the tractor is not attached to the framesets once the tractor has passed the ego vehicle. In another example, the "large animal" metadata and a metadata indicative of a rate at which the detected large animal is moving is added to the framesets in which a large animal is detected.

The scene attribute metadata 1142 may be added to a dataset including data from the autonomous vehicle sensor system. The scene attribute metadata 1142 may include the presence of a feature in the environment surrounding the ego vehicle and a value representative of the intensity of the feature in the environment surrounding the ego vehicle. For example, the scene attribute metadata 1142 includes metadata indicating that the ego vehicle is approaching a steep hill having a guardrail and a dropoff on one side and that the hill has a specific gradient (i.e., a value representative of the intensity of the feature in the environment). The scene attribute metadata 1142 may be added or removed between different framesets. For example, the scene attribute metadata 1142 recognizing the steep hill is not attached to the framesets once the ego vehicle has passed the steep hill. In another example, the "snow" metadata and a metadata indicative of the rate of snowfall is added to the framesets when it is snowing.

The machine learning model error attribute metadata 1144 may be added to a dataset in which there is a difference between the planned movement and the actual movement of the vehicle. The machine learning model error attribute metadata 1144 may include the presence of a prediction error from the machine learning model 570 and a value representative of the intensity of the error of the machine learning model 570. For example, the machine learning model error attribute metadata 1144 includes metadata indicating that the machine learning model 570 originally miscalculated the timing needed to make a left-hand turn based on a predicted movement of the nearby vehicle and the difference between the calculated timing and the corrected timing based on the actual movement of the nearby vehicle. The machine learning model error attribute metadata 1144 may be added or removed between different framesets. For example, the machine learning model error attribute metadata 1144 includes attached to framesets including a U-turn in which no difference between the planned U-turn movement and the actual U-turn movement of vehicle. In another example, the "overtake" metadata and a metadata indicative of the error in overtaking a slower vehicle on the highway is added to the framesets in a vehicle scenario where the ego vehicle overtakes a vehicle on the highway. In some embodiments, the machine learning model 570 error may be simulated.

The custom metric attribute metadata 1146 may be added to a dataset including data having a particular function, feature, or characteristic of the behavior of the ego vehicle. For example, the function or behavior of the ego vehicle includes a brake tap, a gradual coasting stop, and a cruise control. The custom metric attribute metadata 1146 may include the presence of a behavior or function of the ego vehicle and a value representative of the intensity or duration of the feature of the ego vehicle. For example, the custom metric attribute metadata 1146 includes metadata indicating that the ego vehicle is in cruise control mode and a duration of the cruise control mode. The custom metric attribute metadata 1146 may be added or removed between different framesets. For example, the custom metric attribute metadata 1146 indicating a coasted stop is not attached to the framesets once the ego vehicle has coasted to a complete stop. In another example, the "brake tap" metadata and a metadata indicative of the force the user applies the brake during a planned movement of the autonomous vehicle is added to the framesets during a time period before and after the brake tap. In some embodiments, the behaviors or features of the custom metric attribute metadata 1146 may be simulated.

Figure 12:
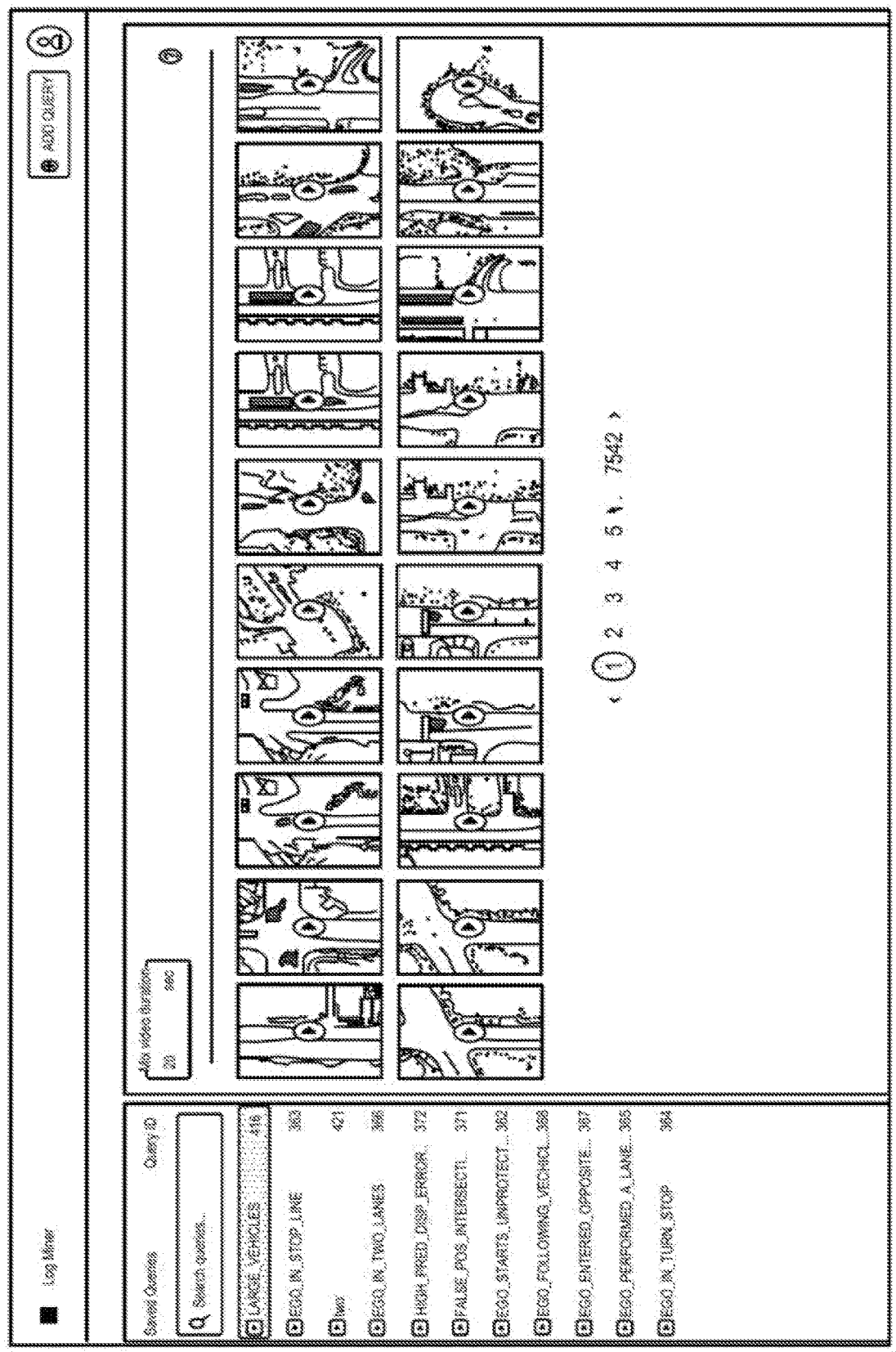
FIG. 12 is a diagram of an example of a user interface for the matching simulations data store.

Referring now to FIG. 12, illustrated is a diagram of an example of a user interface for the matching simulations data store 550. The error-prone scenario 552 from the scenario database 530 may then obtained for inputting into the machine learning model 570 for training the machine learning model 570 on the error-prone scenario 552. This technique may identify error-prone scenarios to determine how the vehicle's systems would handle such scenarios in the real world. The error-prone scenario 552 may be indicative of a scenario in which the planned movements of the machine learning model 570 are uncertain. Without identifying error-prone scenarios and their associated metrics, it may be unclear the extent of the effect that any one of these uncommon scenarios would have on the autonomous vehicle's ability to continue navigation.

The scenarios obtained from the scenario database 530 may be stored in the matching simulations data store 550. The matching simulations data store 550 may include the obtained scenarios having the queried attribute. For example, the matching simulations data store 550 includes the obtained vehicle scenarios based on the queried attribute "large animal" or obtained vehicle scenarios based on the combination of queried attributes of "stroller," "crosswalk," "intersection," and "30 feet from ego vehicle." The different sets of returned vehicle scenarios may be organized into categories that are displayed in a drop-down menu at the user interface 1200 for the matching simulations data store 550.

In some embodiments, the vehicle scenarios obtained from the scenario database 530 may be a dataset a plurality of frames. Each frame of the plurality of frames has a time stamp at a discrete time interval and attribute metadata. The attribute metadata may be based on the data received from the autonomous vehicle sensor system corresponding to the time stamp. In some embodiments, the scenario mining controller 590 may obtain the plurality of frames having the attribute metadata associated with the at least one attribute of the set of attributes. In some embodiments, each frame of the vehicle scenario may be marked with the at least one attribute of the set of attributes.

Figure 13:
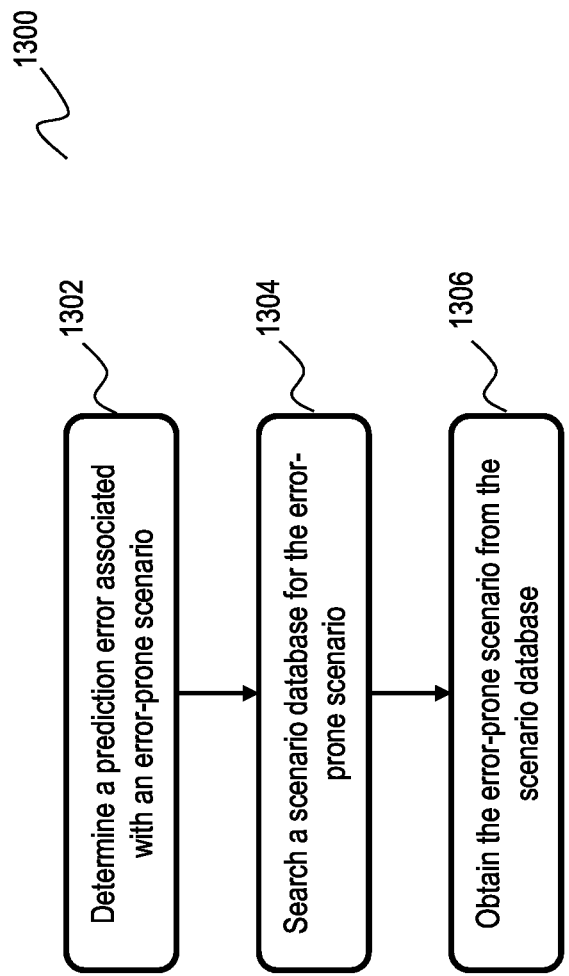
FIG. 13 is a flowchart of a process for a prediction error scenario mining for machine learning models.

Referring now to FIG. 13, illustrated is a flowchart of a process 1100 for prediction error scenario mining for machine learning models. In some embodiments, one or more of the steps described with respect to process 1100 are performed (e.g., completely, partially, and/or the like) by the scenario mining controller 590. Additionally, or alternatively, in some embodiments, one or more steps described with respect to process 1100 are performed (e.g., completely, partially, and/or the like) by another device or group of devices separate from or including the scenario mining controller 590.

At 1302, a prediction error is determined that is indicative of a difference between a planned decision of an autonomous vehicle and an ideal decision of the autonomous vehicle. The prediction error is associated with an error-prone scenario 552 for which the machine learning model 570 of an autonomous vehicle is to make planned movements. For example, an error-prone scenario 552 having a prediction error includes an ego vehicle that is stopped proximate to a large truck at an intersection including a crosswalk with a pedestrian as the ego vehicle plans to make an unprotected left-hand turn based on the predicted movement of nearby vehicles. To capture error-prone scenarios similar to this desired error-prone scenario, the prediction error may be selected from the prediction error data store 510 and may include error modes or error types related to an agent vehicle that is a large truck, a pedestrian detected in a crosswalk at an intersection, and a planned decision to make an unprotected left-hand turn based on the predicted movement of nearby vehicles.

At 1304, a scenario database 530 is searched for the error-prone scenario 552 based on the prediction error. The scenario database 530 includes a plurality of datasets representative of data received from an autonomous vehicle sensor system. For example, a scenario database 530 searches through metadata associated with datasets from an autonomous vehicle sensor system to identify an error-prone scenario 552 having a prediction error with metadata that includes an ego vehicle that is stopped proximate to a large truck at an intersection including a crosswalk with a pedestrian as the ego vehicle plans to make an unprotected left-hand turn based on the predicted movement of nearby vehicles.

At 1306, the error-prone scenario 552 is obtained from the scenario database 530 for inputting into the machine learning model 570 for training the machine learning model 570. The error-prone scenario 552 includes a dataset from the plurality of datasets in the scenario database. The machine learning model 570 may be configured to make the planned movements for the autonomous vehicle. For example, the obtained error-prone scenario 552 of an ego vehicle stopped proximate to a large truck at an intersection including a crosswalk with a pedestrian as the ego vehicle plans to make an unprotected left-hand turn based on the predicted movement of nearby vehicles is inputted to an online machine learning model for further training of the offline machine learning model.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one data processor; and
   at least one memory storing instructions, which when executed by at least one data processor, result in operations comprising:
   obtaining a first error in an output of a machine learning model trained to plan a movement of a vehicle, wherein the first error is indicative of a difference between a planned decision of a vehicle comprising the machine learning model and an ideal decision of the vehicle;
   generating training data including a first scenario associated with the obtained first error, the first scenario retrieved from a scenario database comprising a plurality of datasets representative of data received from a vehicle sensor system;
   and
   updating, based at least on the training data, the machine learning model to plan the movement of the vehicle.

2. The system of claim 1, wherein the first error in the output of the machine learning model includes a prediction error comprising a displacement between a trajectory output by the machine learning model and a ground truth trajectory associated with the first scenario.

3. The system of claim 1, wherein the first error in the output of the machine learning model includes a perception error comprising a difference between a classification of an object present in the first scenario determined by the machine learning model and a ground truth classification of the object.

4. The system of claim 3, wherein the operations further comprise:
   determining that a prediction error associated with determining a trajectory for the first scenario satisfies a first threshold based at least on a perception error associated with identifying one or more objects present in the first scenario satisfying a second threshold; and
   identifying the first scenario based at least on the prediction error associated with the first scenario exceeding the first threshold.

5. The system of claim 1, wherein the first scenario is identified based at least on a first error in an output of the machine learning model satisfying a first threshold.

6. The system of claim 1, wherein a second machine learning model is deployed at a remote server to generate a first label for the first scenario, and wherein the updating of the machine learning model is performed by the remote server before the updated machine learning model is deployed at one or more vehicles.

7. The system of claim 1, wherein the operations further comprise:
generating a first label for the first scenario by applying a second machine learning model also trained to plan the movement of the vehicle.

8. The system of claim 1, wherein the machine learning model comprises at least one of an online machine learning model and an offline machine learning model.

9. The system of claim 1, wherein the machine learning model is trained to classify one or more objects present in an environment in which the vehicle is operating.

10. The system of claim 1, wherein the machine learning model is trained to determine a trajectory for controlling the movement of the vehicle.

11. The system of claim 4, wherein the operations further comprise:
querying the scenario database to identify a second scenario encountered by the vehicle, the second scenario being identified based at least on a second error in the output of the machine learning model while the vehicle encounters the second scenario satisfying the first threshold;
applying a second machine learning model to generate a second label for the second scenario;
applying the updated machine learning model to the second scenario; and
sending the updated machine learning model to one or more vehicles in response to a difference between the output of the updated machine learning model operating on the second scenario and the second label associated with the second scenario satisfying a second threshold.

12. The system of claim 1, wherein the first scenario includes a combination of attributes associated with the at least one of the vehicle, an environment in which the vehicle is operating, and an object in the environment.

13. The system of claim 12, wherein the first scenario is further identified based at least on a difficulty level associated with at least one attribute in the combination of attributes.

14. The system of claim 12, wherein the first scenario is further identified based at least on a frequency at which the machine learning model encounters at least one attribute in the combination of attributes.

15. The system of claim 1, wherein the plurality of datasets in the scenario database comprises a plurality of scenarios, the scenario database further storing, for each scenario of the plurality of scenarios, a respective error in the output of the machine learning model when planning a corresponding movement of the vehicle while the vehicle encounters each scenario.

16. The system of claim 15, wherein each scenario in the scenario database further includes one or more frames, wherein each frame of the one or more frames is associated with at least one attribute, and wherein each frame of the one or more frames is further associated with a timestamp.

17. The system of claim 15, wherein the operations further comprise:
extracting, from data logged by one or more vehicles, a combination of one or more vehicle level attributes, environment level attributes, and object level attributes associated with each scenario included in the scenario database.

18. The system of claim 15, wherein the data logged by the one or more vehicles include at least one of LIDAR sensor data, camera sensor data, RADAR sensor data, and telemetrics sensor data.

19. A method, comprising:
obtaining, using at least one processor, a first error in an output of a machine learning model trained to plan a movement of a vehicle, wherein the first error is indicative of a difference between a planned decision of a vehicle comprising the machine learning model and an ideal decision of the vehicle;
generating, using the at least one processor, training data including a first scenario associated with the obtained first error, the first scenario retrieved from a scenario database comprising a plurality of datasets representative of data received from a vehicle sensor system; and
updating, using the at least one processor, the machine learning model trained to plan the movement of the vehicle based on at least the training data.

20. The method of claim 19, wherein the first error in the output of the machine learning model includes at least one of a prediction error or a perception error, wherein a prediction error comprises a displacement between a trajectory output by the machine learning model and a ground truth trajectory associated with the first scenario, and a perception error comprises a difference between a classification of an object present in the first scenario determined by the machine learning model and a ground truth classification of the object.

21. The method of claim 19, wherein the first scenario is identified based at least one a first error in an output of the machine learning model satisfying a first threshold.

22. The method of claim 20, further comprising:
determining, using the at least one processor, that the prediction error associated with determining a trajectory for the first scenario satisfies a first threshold based at least on the perception error associated with identifying one or more objects present in the first scenario satisfying a second threshold; and
identifying, using the at least one processor, the first scenario based at least on the prediction error associated with the first scenario exceeding the first threshold.

23. The method of claim 19, wherein the machine learning model is trained to at least one of classify one or more objects present in an environment in which the vehicle is operating, or determine a trajectory for controlling the movement of the vehicle.

24. The method of claim 19, further comprising:
identifying, using the at least one processor, a second scenario encountered by the vehicle, the second scenario being identified based at least on a second error in the output of the machine learning model while the vehicle encounters the second scenario satisfying a first threshold;
applying, using the at least one processor, a second machine learning model to generate a second label for the second scenario;
applying, using the at least one processor, the updated machine learning model to the second scenario; and
sending, using the at least one processor, the updated machine learning model to one or more vehicles in response to a difference between the output of the updated machine learning model operating on the second scenario and the second label associated with the second scenario satisfying a second threshold.

25. The method of claim 19, wherein the first scenario includes a combination of attributes associated with the at least one of the vehicle, an environment in which the vehicle is operating, and an object in the environment.

26. The method of claim 25, wherein the first scenario is further identified based at least on a difficulty level associated with at least one attribute in the combination of attributes, or
a frequency at which the machine learning model encounters at least one attribute in the combination of attributes.

27. The method of claim 19, wherein the plurality of datasets in the scenario database comprises a plurality of scenarios, the scenario database further storing, for each scenario of the plurality of scenarios, a respective error in the output of the machine learning model when planning a corresponding movement of the vehicle while the vehicle encounters each scenario.

28. The method of claim 27, wherein each scenario in the scenario database further includes one or more frames, wherein each frame of the one or more frames is associated with at least one attribute, and wherein each frame of the one or more frames is further associated with a timestamp.

29. The method of claim 27, further comprising:
extracting, from data logged by one or more vehicles, a combination of one or more vehicle level attributes, environment level attributes, and object level attributes associated with each scenario included in the scenario database.

30. A non-transitory computer readable medium storing instructions, which when executed by at least one data processor, result in operations comprising:
obtaining a first error in an output of a machine learning model trained to plan a movement of a vehicle, wherein the first error is indicative of a difference between a planned decision of a vehicle comprising the machine learning model and an ideal decision of the vehicle;
generating training data including a first scenario associated with the obtained first error, the first scenario retrieved from a scenario database comprising a plurality of datasets representative of data received from a vehicle sensor system; and
updating, based at least on the training data, the machine learning model to plan the movement of the vehicle.

* * * * *